(12) United States Patent
Gloege et al.

(10) Patent No.: US 10,082,679 B2
(45) Date of Patent: Sep. 25, 2018

(54) SPECTACLE LENS WITH A COATING, METHOD FOR PRODUCING A SPECTACLE LENS AND COMPUTER-IMPLEMENTED OR EXPERIMENTAL METHOD FOR DESIGNING A SPECTACLE LENS

(71) Applicant: Carl Zeiss Vision International GmbH, Aalen (DE)

(72) Inventors: Thomas Gloege, Schorndorf (DE); Michael Krause, Ulm (DE); Christian Lappe, Mutlangen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/789,806

(22) Filed: Oct. 20, 2017

(65) Prior Publication Data

US 2018/0113326 A1    Apr. 26, 2018

(30) Foreign Application Priority Data

Oct. 21, 2016 (DE) .................. 10 2016 120 122

(51) Int. Cl.
*G02C 7/10* (2006.01)
*G02B 1/10* (2015.01)
(Continued)

(52) U.S. Cl.
CPC ............. *G02C 7/10* (2013.01); *G02B 1/10* (2013.01); *G02B 1/11* (2013.01); *G02B 5/26* (2013.01);
(Continued)

(58) Field of Classification Search
CPC .......... G02C 7/081; G02C 7/10; G02C 7/102; G02C 7/104; G02C 7/107
(Continued)

(56) References Cited

U.S. PATENT DOCUMENTS

| | | |
|---|---|---|
| 9,291,746 B2 | 3/2016 | Avetisian, Sr. et al. |
| 2011/0085127 A1 | 4/2011 | Wada |

(Continued)

FOREIGN PATENT DOCUMENTS

| | | |
|---|---|---|
| EP | 3081967 A1 | 10/2016 |
| WO | 2007/115040 A2 | 10/2007 |
| WO | 2012/076714 A1 | 6/2012 |

OTHER PUBLICATIONS

Examination report from the German Patent and Trademark Office issued in DE 10 2016 120 122.7, to which this application claims priority, dated Jul. 4, 2017 and English-language translation thereof.

(Continued)

*Primary Examiner* — Hung Dang
(74) *Attorney, Agent, or Firm* — Ewers & Hasselmann PLLC

(57) ABSTRACT

A spectacle lens is disclosed that includes a lens substrate and a coating that is applied onto the lens substrate. The coating has a first reflectivity of at least 20% for near infrared light at a first wavelength $\lambda_{NIR}$, which impinges on the coating at an angle of incidence of 0°, and a second reflectivity for near infrared light at the first wavelength $\lambda_{NIR}$, which impinges on the coating at an angle of incidence of 35°, the second reflectivity being reduced by at least 10% in relation to the first reflectivity. The present disclosure further relates to a computer-implemented or experimental method for designing such a spectacle lens and a corresponding method for producing a spectacle lens.

17 Claims, 11 Drawing Sheets

(51) Int. Cl.
  G02B 1/11    (2015.01)
  G02C 7/02    (2006.01)
  G02B 5/26    (2006.01)
  G02B 5/28    (2006.01)

(52) U.S. Cl.
  CPC ............ *G02B 5/282* (2013.01); *G02B 5/285* (2013.01); *G02C 7/024* (2013.01); *G02C 7/104* (2013.01); *G02C 7/107* (2013.01); *G02C 2202/16* (2013.01)

(58) Field of Classification Search
  USPC .......................................... 351/159.62, 159.6
  See application file for complete search history.

(56) References Cited

U.S. PATENT DOCUMENTS

2013/0038834 A1* 2/2013 Cado ...................... G02B 1/115
                                                                 351/159.62
2015/0146161 A1    5/2015  Rigato et al.
2015/0241602 A1    8/2015  Avetisian, Sr. et al.
2015/0293284 A1   10/2015  Tatemura

OTHER PUBLICATIONS

Decision to Grant from the German Patent and Trademark Office issued in DE 10 2016 120 122.7, to which this application claims priority, dated Sep. 20, 2017 and English-language translation thereof.

Tikhonravov et al.: Development of the needle optimization technique and new features of "OptiLayer" design Software; Visual Communications and Image Processing; Jan. 20, 2004-Jan. 20, 2004; San Jose, vol. 2253, pp. 10 to 20, XP007915354, ISBN: 978-1-62841-730-2, Nov. 4, 1994.

"Features of OptiLayer Software Family," Internet citation, available at www.optilayer.com/features.htm, last accessed Apr. 21, 2010.

Ophthalmic optics—Spectacle lenses—Vocabulary (ISO 13666:2012); German and English version EN ISO 13666:2012, Oct. 2013.

* cited by examiner

SPECTACLE LENS WITH A COATING, METHOD FOR PRODUCING A SPECTACLE LENS AND COMPUTER-IMPLEMENTED OR EXPERIMENTAL METHOD FOR DESIGNING A SPECTACLE LENS

CROSS REFERENCE TO RELATED APPLICATION

This application claims priority to German patent application DE 10 2016 120 122.7, filed Oct. 21, 2016, the entire content of which is incorporated herein by reference.

TECHNICAL FIELD

The present disclosure relates to a spectacle lens with a lens substrate and a coating on the lens substrate. The disclosure further relates to a computer-implemented or experimental method for designing such a spectacle lens and a corresponding method for producing a spectacle lens.

BACKGROUND

It is known that certain spectral ranges of light are able to damage the human eye if they are radiated onto the eye at a high intensity or with a relatively long exposure duration. The cornea, lens, and retina are particularly sensitive. Further, it is known to provide high-quality spectacle lenses with a protective effect in the ultraviolet (UV) spectral range.

U.S. Pat. No. 9,291,746 B2 discloses a spectacle lens of the type set forth at the outset. In order to protect the eyes, provision is made of an antireflection coating with an antireflection effect over the entire spectral range from the UV-B range into the IR-A range. The protection for the eye is achieved by virtue of light that is incident from behind not being reflected back into the eye of the spectacle wearer, but instead being able to pass through the spectacles due to the antireflective effect or antireflection coating. Here, all shown embodiments have a lower reflectivity at an angle of incidence of 0° than in the case of a larger angle of incidence of 30° or 45°.

However, there is still the problem that radiation that is incident from the front is able to penetrate into the eye. In so doing, the amount of radiation is even increased as a result of the antireflective effect.

US 2015/0146161 A1 discloses a spectacle lens of the type set forth at the outset that includes a coating which acts as an infrared mirror in the infrared spectral range and effectively reduces infrared radiation that is incident from the front. As a result, the eyes can be protected from radiation that is incident from the front.

SUMMARY

Against this backdrop, it is an object of the present disclosure to provide a spectacle lens that provides an improved protective effect.

Therefore, according to a first aspect of the disclosure, the provision of a spectacle lens is proposed, wherein the spectacle lens includes a lens substrate and a coating that is applied onto the lens substrate, wherein the coating has a first reflectivity of at least 20% for near infrared light at a first wavelength $\lambda_{NIR}$, which impinges on the coating at an angle of incidence of 0°, and wherein the coating has a second reflectivity for near infrared light at the first wavelength $\lambda_{NIR}$, which impinges on the coating at an angle of incidence of 35°, the second reflectivity being reduced by at least 10% in relation to the first reflectivity.

The increasing use of infrared (IR) cameras provided with IR emitters for a subtle illumination leads, inter alia, to an increased exposure of humans in relation to relatively strong IR emitters in road traffic. Infrared-based light systems aid with the orientation, particularly at night, when the vision in the visible spectral range from 380 nm to 780 nm is increasingly restricted. Such systems are also referred to as night vision assistants or night vision devices. An advantage of night vision assistants consists of being able to illuminate a large visual field by an infrared headlamp, without the other road users perceiving glare.

However, the pupils are wide open in the case of darkness or weak illumination during twilight, and so IR radiation of vehicles equipped with night vision technology can be incident directly on the retina. Here, it should be noted that infrared radiation does not activate the protective reflex of the eye of reducing the pupil or shutting the lid. Putting the eyes at risk within the scope of these environmental conditions cannot be precluded. Because conventional spectacle lens materials have a low absorption, particularly in a range from 800 nm to 1500 nm, there is no protective effect by way of conventional spectacle lenses.

In road traffic, substantially two scenarios with an increased infrared exposure may occur: (a) a back-side reflection of infrared radiation that is incident obliquely from behind, as may occur, for example, by way of a vehicle with an infrared night vision assistant travelling in the same direction with a slight backward offset on a parallel lane, and (b) exposure to infrared radiation incident from the front, as may occur in the case of an oncoming vehicle with an infrared night vision assistant.

The documents U.S. Pat. No. 9,291,746 B2 and US 2015/0146161 A1 set forth at the outset respectively solve the partial problems (a) or (b) in their own right. A combination of the teaching of the two documents with an IR antireflection coating on the back side and an IR mirror on the front side of the spectacle lens would, however, not lead to the desired result of a sufficient protective effect in both scenarios. By virtue of the mirroring effect in the infrared spectral range coming to bear not only in the case of radiation incident from the front but also in the case of radiation incident from behind, the return reflection at the back surface of the spectacle lens would be reduced, but this effect would be rendered void by the dielectric mirror on the front surface and the radiation would nevertheless reach the eye of the user.

Therefore, the provision of a coating is proposed, said coating having a first reflectivity of at least 20% for near infrared light at a first wavelength $\lambda_{NIR}$, which impinges on the coating at an angle of incidence of 0°, and further having a second reflectivity for near infrared light at the first wavelength $\lambda_{NIR}$, which impinges on the coating at an angle of incidence of 35°, the second reflectivity being reduced by at least 10% in relation to the first reflectivity. Preferably, an improved protective effect against infrared emitters in the automotive sector or in road traffic can be achieved therewith.

As a result of the proposed angle dependence at a wavelength $\lambda_{NIR}$ in the near infrared range, a light component incident from the front is reduced more strongly, whereas a light component incident obliquely from behind can pass through the lens as a result of the reduced reflectivity. The reflectivity of at least 20% in the case of an angle of incidence of 0° makes it clear that, in contrast to U.S. Pat. No. 9,291,746 B2, this, in particular, does not relate to an antireflection coating or antireflective effect. Typically, the reflectivity is 30%, 40%, 50%, 60% or else 70% or more. Also typically, provision can also be made of an even greater difference between the reflectivity at the angle of incidence of 35° and of 0°.

On account of the wearing position of spectacles, the infrared radiation is incident on the spectacle lens together with the visible light at an angle of approximately 0° (usually ±15°) when looking into the radiation source (the most dangerous orientation), and so the mirroring effect of the spectacle lens is maximized at 0°. By contrast, the angle range around 0° is less important for radiation coming from behind since it is substantially only the inherent human thermal radiation that is reflected in this case. However, the risk potential of the inherent thermal radiation can be assessed to be low. By contrast, the angle range between 35° and 60° of the incident light in relation to the perpendicular on the lens surface, in which the radiation can be reflected into the human eye by total internal reflection, is decisive for the back side.

According to an aspect of the disclosure, an interaction between the reflectivity at the angle of incidence of 0° and the reflectivity at the angle of incidence of 35° can further be taken into account. An increase in the reflectivity at the angle of incidence of 0° may also lead to an increase in the reflectivity at the angle of incidence of 35°. By providing a reflectivity that is not too high at the angle of incidence of 0°, for example of at least 20%, but of no more than 70%, typically of no more than 60%, 50% or 40%, it is possible to obtain a sufficiently reduced reflectivity or sufficiently low reflectivity at the wavelength $\lambda_{NIR}$ in the near infrared range for radiation that is incident obliquely from behind in the case of a layer structure with a restricted complexity.

When used in night assistance systems in the automotive sector, the user is only exposed to the infrared radiation of oncoming vehicles for relatively short time intervals in the case of moderate traffic flow because the oncoming vehicles pass the vehicle of the user in the opposite direction. By contrast, exposure may exist over an ongoing period of time in the case of infrared radiation that is incident obliquely from behind, for example if a vehicle travels at a similar speed with a slight offset on a parallel lane. In this respect, a reflectivity of at least 20% may be sufficient in the case of an angle of incidence of 0°. As a result, it is possible to obtain a sufficiently reduced reflectivity or sufficiently low reflectivity at the wavelength $\lambda_{NIR}$ in the near infrared range for radiation that is incident obliquely from behind with a layer structure with a restricted complexity.

Further, the proposed spectacle lens can also offer an improved protective effect in the case of solar radiation that is incident both from the front and obliquely from behind. As a result of the mirroring effect at an angle of incidence of 0°, radiation incident from the front, for example as a result of reflection on surfaces, such as reflections on a water surface, can be reduced, wherein, at the same time, a larger portion of the radiation that is incident obliquely from behind passes the spectacle lens as a result of the reduced reflectivity at an angle of incidence of 35° and, as a consequence, it is not reflected back into the eye. Here, a possible application of the spectacle lenses is reading a book outside, in particular on a beach.

Typically, the spectacle lens has an optical power that differs from zero. The lens substrate typically has a UV absorber.

According to a second aspect of the present disclosure, a computer-implemented or experimental method for designing a spectacle lens includes a lens substrate and a coating that is applied onto the lens substrate, with a layer sequence forming the coating, is proposed, wherein the method comprises the following step:

determining the layer sequence, wherein the layer sequence is determined with the stipulation that the coating has a first reflectivity of at least 20% for near infrared light at a first wavelength $\lambda_{NIR}$, which impinges on the coating at an angle of incidence of 0°, and a second reflectivity for near infrared light at the first wavelength $\lambda_{NIR}$, which impinges on the coating at an angle of incidence of 35°, the second reflectivity being reduced by at least 10% in relation to the first reflectivity.

According to a third aspect of the present disclosure, a method for producing a spectacle lens including a lens substrate and a coating that is applied onto the lens substrate is proposed, wherein the method comprises the following steps:

providing a lens substrate;
applying a layer sequence that forms the coating onto the lens substrate, wherein the coating is applied with the stipulation that the coating has a first reflectivity of at least 20% for near infrared light at a first wavelength $\lambda_{NIR}$, which impinges on the coating at an angle of incidence of 0°, and a second reflectivity for near infrared light at the first wavelength $\lambda_{NIR}$, which impinges on the coating at an angle of incidence of 35°, the second reflectivity being reduced by at least 10% in relation to the first reflectivity.

According to a fourth aspect of the present disclosure, spectacles are proposed, comprising a frame as well as a first spectacle lens and a second spectacle lens according to the first aspect.

Unless explicitly stated otherwise, the terms used herein should be understood within the meaning of the standard DIN EN ISO 13666:2012 by the Deutsches Institut für Normung e.V. [German Institute for Standardization].

The angle of incidence relates to an angle in relation to the surface normal or perpendicular to the surface of the spectacle lens. In particular, the angle of incidence can be determined at a vertex of the spectacle lens pursuant to Section 4.9 of the DIN EN ISO 13666:2012 standard.

Pursuant to section 4.2 of the DIN EN ISO 13666:2012 standard, the terms visible light, visible radiation, or visible wavelength range relates to optical radiation which is capable of directly causing a visual sensation in a human. Visible radiation may relate to a wavelength range of 400 nm to 780 nm. However, within the scope of this disclosure, visible radiation may preferably relate to a wavelength range of 400 nm or 460 nm to 700 nm. In particular, this covers the sensitivity maximum of the eye and, at the same time, increases the design flexibility for the design of the filter properties and edge steepness.

Pursuant to section 4.3 of the DIN EN ISO 13666:2012 standard, ultraviolet radiation is understood to be optical radiation for which the wavelengths are shorter than those for visible radiation. The ultraviolet radiation range between 100 nm and 400 nm is usually subdivided into: UV-A (315 nm to 400 nm), UV-B (280 nm to 315 nm) and UV-C (100 nm to 280 nm). As an alternative, 380 nm can be used as an upper limit for UV-A. The spectral range of UV-C effectively is 200 nm to 280 nm because the atmosphere sufficiently absorbs radiation with wavelengths shorter than 200 nm.

Pursuant to section 4.3 of the DIN EN ISO 13666:2012 standard, infrared radiation should be understood to be optical radiation for which the wavelengths are longer than those for visible radiation. The range from 780 nm to 3 µm is also referred to as the near infrared range. Here, a distinction is made between IR-A (780 nm to 1400 nm) and IR-B (1.4 μm to 3 μm). At sea level, the infrared spectrum to be taken into account extends up to approximately 2 μm. Further, conventional spectacle lens materials already offer sufficient absorption of infrared radiation for wavelengths between greater than approximately 1.7 μm and 2 μm on account of the material properties thereof.

Pursuant to section 5.8 of the DIN EN ISO 13666:2012 standard, the term front surface or object-side surface denotes that surface of a spectacle lens intended to be fitted away from the eye. Pursuant to section 5.19 of the DIN EN ISO 13666:2012 standard, the term back surface or eye-side surface denotes that surface of a spectacle lens intended to be fitted nearer to the eye. The terms front surface and back surface are used here accordingly for the lens substrate.

Within the scope of the present disclosure, the term spectacle lens denotes, in particular, a coated spectacle lens pursuant to section 8.1.13 of the DIN EN ISO 13666:2012 standard, i.e., a spectacle lens to which one or more surface coatings have been applied, typically to change one or more of its properties. The spectacle lenses described herein can be used advantageously in the following fields in particular: spectacles (with and without correction), sunglasses, ski goggles, workplace spectacles, and spectacles in conjunction with head-mounted display devices (head-mounted displays).

Within the scope of the present disclosure, the term spectacle lens may further comprise spectacle lens semi-finished products, in particular, a spectacle lens blank or semi-finished spectacle lens pursuant to section 8.4.2 of the DIN EN ISO 13666:2012 standard, i.e., a lens blank or blank having only one optically finished surface. By contrast, the term lens substrate relates to a spectacle lens (including semi-finished products) without a coating according to an aspect of the disclosure.

According to section 15.1 of the DIN EN ISO 13666:2012 standard, the term spectral reflectance, reflectance or reflectivity denotes the ratio of the spectral radiation power reflected by the respective material or the surface or coating to the incident radiation power at a specific wavelength ($\lambda$). In the present case, the reflectivity relates to the reflectivity of the entire coating with its plurality of high refractive and low refractive layers and not to the reflectivity of an individual layer.

Pursuant to section 15.2 of the DIN EN ISO 13666:2012 standard, the term spectral transmittance or transmission denotes the ratio of the spectral radiation power transmitted by the respective material to the incident radiation power at a specific wavelength ($\lambda$).

Pursuant to section 15.4 of the DIN EN ISO 13666:2012 standard, the term luminous transmission denotes the ratio of the luminous flux transmitted by the spectacle lens or filter or, in this case, by the coating to the incident luminous flux. Here, there is weighting with the sensitivity function of the human eye for daylight vision and the spectral radiation distribution of the CIE standard illuminant D65. Deviating from the aforementioned standard, it is possible here to take into account a wavelength range from 400 nm or 460 nm to 700 nm or 780 nm.

It is understood that even more manufacturing steps can be undertaken, such as the application of additional layers of the coating, for example a protective layer against scratches or the application of a conductive antistatic layer to obtain an antistatic effect. In particular, additional layers may also be inserted within a layer sequence of the exemplary embodiments specified in the subsequent description to obtain additional functionalities. By way of example, the insertion of an ITO layer with a thickness of approximately 3 nm within a layer sequence specified in the subsequent description may provide an antistatic effect, without having a substantial influence on the spectral reflectivity. Here, it may be advantageous to insert the ITO layer not as a termination layer but within the layer sequence. It is understood that there is an interaction between the layers of the coating, and so it is not possible to undertake a partition, but instead the entire effect of the coating should be taken into account in respect of the optical properties, in particular in respect of the angle-dependent reflectivity.

Here, in particular, the term coating may relate to a dielectric coating with a layer sequence of high refractive and low refractive layers. Such a dielectric mirror or filter can also be referred to as Bragg reflector. Optionally, such a coating may also have mid refractive layers with a refractive index that lies between the refractive indices of the high refractive and low refractive layers. Such a coating may be applied by a vacuum coating method, for example, by vaporization or evaporation, sputtering or cathode sputtering or chemical vapour deposition.

In the present case, the stipulation should be understood to mean a boundary condition to be satisfied within the meaning of a functional feature definition. In particular, this may be a property or a boundary condition for an iterative approximation or optimization method, which represent the basis for such methods.

In an exemplary embodiment, provision can be made for the mean transmission or the luminous transmission of the spectacle lens in a visible wavelength range of 400 nm to 700 nm and in the case of an angle of incidence of 0° to be at least 95%, preferably at least 98%. Here, this is a weighted transmission in the visible range, which takes into account the eye sensitivity function. Therefore, transmission should be understood to mean the luminous transmission pursuant to section 15.4 of the DIN EN ISO 13666:2012 standard, i.e., the ratio of the luminous flux transmitted by the spectacle lens to the incident luminous flux in the specified spectral range. It is also possible to consider the wavelength ranges from 400 nm to 780 nm, from 460 nm to 700 nm and from 460 nm to 780 nm. Expressed differently, this is a spectacle lens that is transparent to visible light for the user. Alternatively, tinting may additionally be provided, for example, when used as sunglasses.

In an exemplary embodiment, the wavelength $\lambda_{NIR}$ in the near infrared may lie in a wavelength range from the group of wavelength ranges of from 780 nm to 1500 nm, from 800 nm to 1200 nm, and from 850 nm to 1100 nm. By way of example, the wavelength may be $\lambda_{NIR}=1000$ nm. Typically, the infrared wavelength is matched to a predetermined radiation source, such as the emission maximum of an infrared headlamp of a night vision assistant in the automotive sector.

In a further exemplary embodiment, the coating can have a reflectivity that is reduced by at least 10% in relation to the angle of incidence of 0° over a wavelength range which comprises the wavelength $\lambda_{NIR}$ in the near infrared range. An advantage of this configuration is that this can also take account of a broadband radiation source. Infrared radiation sources are usually not monochromatic light sources but, for example, an infrared LED headlamp with a relatively broad emission spectrum. The protective effect over this range can be ensured by the coating accounting for the wavelength range.

In a further exemplary embodiment, at an angle of incidence of 0°, the coating has a reflectivity from a group of reflectivities of at least 25%, of at least 30%, of at least 40% and of at least 50% at the wavelength $\lambda_{NIR}$ in the near infrared range. In particular, the coating may have a reflectivity of at least 60%, 70% or 80% at an angle of incidence of 0°. Thus, it is understood that the proposed coating precisely does not act as an antireflection coating, in particular at the wavelength $\lambda_{NIR}$, but instead as a coating with a reflective effect.

In an exemplary embodiment, at an angle of incidence of 35°, the coating has a reflectivity that is reduced by at least an amount selected from the group of 15%, 20%, 25% and 30% in relation to the angle of incidence of 0° at the wavelength $\lambda_{NIR}$ in the near infrared range. In particular, the coating may have a reflectivity at an angle of incidence of 35° that is reduced by at least 40%, 50%, 60% or 70% in relation to the angle of incidence of 0°. As a result, a greater difference is achieved between the mirroring effect for radiation incident from the front (for example at an angle of incidence of 0°±15°) and radiation incident obliquely from behind. It is understood that the reflectivity does not assume negative values. By way of example, the coating may have a reflectivity of 50% at an angle of incidence of 0° and a reflectivity of 25% at an angle of incidence of 35°, i.e., a reflectivity that has been reduced by 25% in absolute terms or 50% in relative terms at an angle of incidence of 35° in relation to the angle of incidence of 0°. Within the scope of the present disclosure, a percentage number for the reduced reflectivity may relate to an absolute reduction in the reflectivity or a relative reduction in the reflectivity.

In an exemplary embodiment, over an angle of incidence range of 30° to 45°, the coating has a reflectivity that is reduced by at least 10% in relation to the angle of incidence of 0° at the wavelength $\lambda_{NIR}$ in the near infrared range. An advantage of this configuration is that the protective effect can be ensured over a large angular range. Typically, an angle of incidence range and a wavelength range, which comprises the wavelength $\lambda_{NIR}$, can be combined.

In a further exemplary embodiment, the lens substrate has a front surface and a back surface and the coating is applied onto the front surface of the lens substrate. An advantage of this configuration is that the front surface can be provided with the coating already during the manufacturing process. In particular, the front surface can be coated before the processing of the back surface, for example by using a free form generator, has been completed. Typically, it is therefore possible to provide a spectacle lens semi-finished product and/or a spectacle lens blank with a front surface whose processing has already been finished.

In yet another exemplary embodiment, the lens substrate may further contain an IR absorber. An advantage of this configuration is to be able to further reduce the infrared radiation. The effect of an IR absorber (infrared absorber) can be particularly advantageous if the coating is applied onto the front side. Naturally, a dielectric coating has the same effect in both directions. The remaining radiation component that remains when light enters from behind reaches the front surface and is back-reflected off the coating of the front surface, experiences two passages through the substrate with the IR absorber (path forth and back) in this case, and so the infrared radiation is attenuated twice.

Moreover, a synergistic effect may emerge from the combination of IR absorber and coating on the front surface of the lens substrate. The service life of the substrate with the IR absorber may be increased by the at least partly reflective effect of the coating on the front side because less infrared radiation impinges on the IR absorber. As a result, there may also be an improved transmission in the visible range over the service life because ageing effects of IR absorbers, which may have an influence in the visible spectral range, can be reduced.

IR absorbers, for example in the form of infrared-light-absorbing dyes, may be introduced using various methods. By way of example, the dyes can be mixed into a monomer mixture of the substrate, and so they can be added together with, e.g., UV absorbers and cured therewith or processed by injection moulding with, in particular, a thermoplastic polymer. Here, this may be a polymer product in which the dyes are distributed homogeneously or a polymer product in which the dye or dyes are situated in a layer on the surface with a thickness of, e.g., 500 μm or less.

Alternatively, an admixture of the IR absorber to a lacquer that is applied onto the substrate (e.g., UV or thermally curing) may be provided. Typically, this may simultaneously also act as a primer or hard coat. Here, a higher absorber concentration may be provided to obtain the same effect as in the case of admixing to the substrate material, for example 0.02 to 4 mass percent, typically between 0.1 and 1 mass percent, more typically between 0.2 and 0.75 mass percent. An optional primer or primer layer may be applied onto the lens substrate so that a functional coating adheres better. An optional hard coat can protect the spectacle lens from scratches.

Further, an IR absorber can be introduced by diffusion into the substrate material or the coating, in particular the hard coat, in a manner analogous to dyeing of glasses or via thermal transfer or imbibing. Here, use is preferably made of dyes with a high quantum yield so that the usually thin layer thicknesses of the coating are able to bring about a significant reduction in the transmission. IR absorbers can be gathered, inter alia, from the substance class of the (quater) rylenes, the phenylenediamines or the metal complexes with suitable charge transfer transitions. Examples include (bis (4,4'-dimethoxydithiobenzil)nickel (CAS 38465-55-3), bis (4-dimethylaminodithiobenzil)nickel) (CAS 38951-97-2); N,N,N',N'-tetrakis(4-dibutylaminophenyl)-p-phenylenediaminium hexafluorophosphate (CAS 152340-26-6), anthra [9''',1''',2'':6,5,10;10'',5'',6'':6',5',10']dianthra[2,1,9-def:2',1', 9'-d'e'f'] diisoquinoline-1,3,12,14(2H,13H) (CAS 165550-64-1), anthra[9''',1''',2'':6,5,10;10'',5'',6'':6',5',10] dianthra[2, 1,9-def:2',1',9'-d'e'f']diisoquinoline-1,3,12,14(2H,13H)-tetrone, 2,13-bis[2,6-bis(1-methylethyl) phenyl]-5,10,16, 21-tetrakis[4-(1,1,3,3-tetramethylbutyl)phenoxy] (CAS 333304-54-4) and the like.

In an exemplary embodiment, a coating according to the present disclosure may further be applied onto the back surface of the lens substrate. By way of example, the same coating may be provided on the front surface and on the back surface. However, a different configuration of the coating according to an aspect of the present disclosure may be provided, alternatively, for the back surface. An advantage of providing such a coating both on the front surface and the back surface is that the IR transmission is reduced even more significantly and, consequently, an improved protective effect can be achieved. Alternatively or additionally, a simpler layer structure may be sufficient to achieve a desired effect. As a result, the coatings can be produced more cost-effectively. Preferably, a coating on the front surface and back surface is combined with an IR absorber in the lens substrate. The reduced reflectivity for radiation that is incident obliquely from behind by way of the back-side coating can, together with the IR absorber in the lens substrate, attenuate an IR ray exposure of the eye and further improve the protective effect.

In an exemplary embodiment, the lens substrate has a front surface and a back surface and the back surface has an antireflection coating for at least one light range selected from the group of visible light, IR light, and UV light. Here, the coating proposed at the outset can be provided on the front surface. As a result of using such an antireflection coating, as is known from, e.g., U.S. Pat. No. 9,291,746 B2, it is possible to obtain an additional protective function. In particular, an infrared antireflection (IR-AR) coating may be provided on the front surface and/or back surface. An advantageous protective effect can be developed by a front surface and back surface coating, in particular in combination with an IR absorber in the lens substrate. Here, this may be, e.g., a ceramic or hybrid coating (e.g. organic-inorganic hybrid layers on the basis of sol-gel processes) which, preferably, also has a reducing action on the reflection in the infrared spectrum in addition to an effect as an antireflection layer in the visible range.

In a further exemplary embodiment, the lens substrate has a front surface and a back surface and the front surface has a reflecting coating for at least one light range selected from the group of UV light and short-wavelength blue light. Expressed differently, a coating on the front side has a reflective effect for UV light and/or short-wavelength blue light. The coating can be a coating according to the first aspect which, additionally, offers a corresponding reflective effect. An advantage of this embodiment is a further improved protective effect in additional spectral ranges. It is understood that, as an alternative or in addition to the front surface, the coating on the back surface may also be configured with such properties. The protective effect for short wavelength blue light is also referred to as blue cut. Blue cut should preferably be understood to mean a (ceramic or hybrid) antireflection coating which, in particular, has with high effectiveness an increased reflectivity for short-wavelength blue light at the edge of the UV range, for example from 400 nm to 460 nm (high-energy visible (HEV) light). Further, a transmission of the spectacle lens of at least 95%, preferably at least 98%, may be provided in a visible wavelength range from 460 nm to 700 nm.

In a further exemplary embodiment, the coating contains materials with a high refractive index, materials with a mid refractive index and materials with a low refractive index. An advantage of this configuration is the effect of the layer system of the coating being provided with more flexibility by the addition of a third component with a mid refractive index (lying between the high refractive index and the low refractive index). Typically, the number of layers required for a desired effect can be reduced. A material, such as $TiO_2$, with a refractive index above that of the substrate material may be used as material with a high refractive index. By way of example, metal oxides selected from a group of oxides of Zr, Ti, Al, Y, Ta, Nd, La, Nb, and Pr or combinations thereof can be used as materials with a high refractive index or so-called high index materials. A material with a refractive index below that of the substrate material may be used as material with a low refractive index. By way of example, $SiO_2$ can be used to this end. Alternatively, it is also possible to use mixtures of $SiO_2$ with aluminium. $ZrO_2$ can be used as an exemplary material with a mid refractive index. By way of example, a material with a high refractive index may have a refractive index of $n>2.0$, a material with a mid refractive index may have a refractive index of $n=1.5$ to $n=2.0$ and a material with a low refractive index may have a refractive index of $n<1.5$. It is understood that, depending on application and employed lens substrate material, use can also be made of deviating ranges, for example relative specifications of the materials in relation to one another or in relation to a refractive index of the lens substrate material.

In an exemplary embodiment, the coating may have the following layer sequence: a first layer of $TiO_2$, followed by a first layer of $SiO_2$, followed by a second layer of $TiO_2$, followed by a second layer of $SiO_2$, followed by a third layer of $TiO_2$, followed by a third layer of $SiO_2$, followed by a first layer of $ZrO_2$, followed by a fourth layer of $TiO_2$, followed by a second layer of $ZrO_2$, followed by a fifth layer of $TiO_2$. A hard coat layer (hard coat) may be provided between the lens substrate and the first layer of $TiO_2$. Optionally, further termination layers may be provided.

In an exemplary embodiment, the coating may have a termination layer with a high refractive index. An advantage of this configuration is an advantageous mirroring effect also being able to be achieved in the infrared range as a result of the large index difference between the termination layer with a high refractive index and the surrounding air.

In an exemplary embodiment, the coating further contains a conductive layer. By way of example, to this end, use may be made of a transparent conductive oxide such as indium tin oxide $((In_2O_3)_{0.9} (SnO_2)_{0.1}$; ITO), fluorine-doped tin oxide ($SnO_2$:F; FTO), aluminium-doped zinc oxide (ZnO:Al; AZO) or antimony-doped tin oxide ($SnO_2$:Sb; ATO). An advantage of this configuration is that it can avoid static charging. As a result, cleaning of the spectacle lens can be improved. Moreover, additional layers may be installed, for example, to improve the mechanical stability of the layer system. To this end, use can be made of layers with a thickness of ≥100 nm.

In a further exemplary embodiment, the coating includes at least five layers, in particular at least six layers, more particularly at least seven layers, even more particularly at least eight layers, yet even more particularly at least nine layers, and most particularly at least ten layers. An advantage of this configuration is to be able to achieve a well-defined transmission effect and reflection effect with the desired angular dependence.

In an exemplary embodiment of the method according to the second aspect of the disclosure as a computer-implemented method, determining the layer sequence may comprise the following steps:

a) providing parameters that describe a first layer sequence of a coating;

b) providing a first limit of at least 20% that represents the first reflectivity;

c) determining the reflectivity of the coating for near infrared light at the first wavelength $\lambda_{NIR}$, which is incident on the coating at the angle of incidence of 0°;

d) comparing the reflectivity determined in step c) with the first limit;

e1) should the comparison carried out in step d) determine that the first limit was not exceeded by the reflectivity determined in step c):

f1) modifying the parameters that describe the first layer sequence, and g1) carrying out steps c) to d);

e2) should the comparison carried out in step d) determine that the first limit was exceeded:

f2) determining the reflectivity of the coating for near infrared light at the first wavelength $\lambda_{NIR}$, which is incident on the coating at the angle of incidence of 35°, g2) comparing the reflectivity determined in step f2) with the reflectivity determined in step c), h2.1) should the comparison carried out in step g2) determine that the reflectivity determined in step f2) does not drop below the reflectivity determined in step c) by more than 10%:
  i2.1) modifying the parameters that describe the first layer sequence, and
  j2.1) carrying out steps c) to d);
h2.2) should the comparison carried out in step g2) determine that the reflectivity determined in step f2) drops below the reflectivity determined in step c) by more than 10%:
  k2.2) outputting the parameters describing the first layer sequence as the parameters describing the layer sequence of the coating.

As a consequence, the layer sequence can typically be determined in an iterative method, in particular an iterative approximation or optimization method. To this end, use can be made of commercially available programs, for example the software by OptiLayer GmbH, Garching, Germany, which is distributed in Europe by Langbein Thelen Consulting in Heidelberg, Germany. Further distribution channels can be found at www.optilayer.com/distributors.

In a further exemplary embodiment of the method according to the second aspect of the disclosure as an experimental method, determining the layer sequence may comprise the following steps:
  a) providing a first layer sequence of a coating;
  b) providing a first limit of at least 20% that represents the first reflectivity;
  c) measuring the reflectivity of the coating for near infrared light at the first wavelength $\lambda_{NIR}$, which is incident on the coating at the angle of incidence of 0°;
  d) comparing the reflectivity measured in step c) with the first limit
  e1) should the comparison carried out in step d) determine that the first limit was not exceeded by the reflectivity determined in step c):
    f1) modifying the first layer sequence, and
    g1) carrying out steps c) to d);
  e2) should the comparison carried out in step d) determine that the first limit was exceeded:
    f2) measuring the reflectivity of the coating for near infrared light at the first wavelength $\lambda_{NIR}$, which is incident on the coating at the angle of incidence of 35°,
    g2) comparing the reflectivity measured in step f2) with the reflectivity measured in step c),
    h2.1) should the comparison carried out in step g2) determine that the reflectivity measured in step f2) does not drop below the reflectivity measured in step c) by more than 10%:
      i2.1) modifying the first layer sequence; and
      j2.1) carrying out steps c) to d);
    h2.2) should the comparison carried out in step g2) determine that the reflectivity measured in step f2) drops below the reflectivity measured in step c) by more than 10%:
      k2.2) applying the first layer sequence as the layer sequence for the coating.

Using the sequence described herein in an exemplary manner, it is consequently possible to determine the layer sequence by an experimental iterative method, in particular by an iterative approximation or optimization method.

In an exemplary embodiment of the method according to the second aspect of the disclosure as a computer-implemented method, determining the layer sequence may comprise the following steps:
  a) providing parameters that describe a first layer sequence of a coating;
  b) providing a first limit of at least 20% that represents the first reflectivity;
  c) determining the reflectivity of the coating for near infrared light at the first wavelength $\lambda_{NIR}$, which is incident on the coating at the angle of incidence of 0°;
  d) determining the reflectivity of the coating for near infrared light at the first wavelength $\lambda_{NIR}$, which is incident on the coating at the angle of incidence of 35°;
  e) comparing the reflectivity determined in step c) with the first limit;
  f1) should the comparison carried out in step e) determine that the first limit was not exceeded by the reflectivity determined in step c):
    g1) modifying the parameters that describe the first layer sequence, and
    h1) carrying out steps c) to e);
  f2) should the comparison carried out in step e) determine that the first limit was exceeded:
    g2) comparing the reflectivity determined in step d) with the reflectivity determined in step c);
    h2.1) should the comparison carried out in step g2) determine that the reflectivity determined in step d) does not drop below the reflectivity determined in step c) by more than 10%:
      i2.1) modifying the parameters that describe the first layer sequence, and
      j2.1) carrying out steps c) to e);
    h2.2) should the comparison carried out in step g2) determine that the reflectivity determined in step d) drops below the reflectivity determined in step c) by more than 10%:
      k2.2) outputting the parameters describing the first layer sequence as the parameters describing the layer sequence of the coating.

The developments described herein for a computer-implemented method may be applied accordingly to an experimental method for designing a spectacle lens.

The advantages described in detail above for the first aspect of the disclosure apply accordingly to the further aspects of the disclosure.

It goes without saying that the aforementioned features and those yet to be explained below can be used not only in the combination specified in each case but also in other combinations or on their own, without departing from the scope of the present disclosure. In particular, substantiations in respect of wavelength range, angle of incidence range, reflectivity at 0° and/or reflectivity at 35° can be combined with one another.

BRIEF DESCRIPTION OF THE DRAWINGS

The disclosure will now be described with reference to the drawings wherein.

DESCRIPTION OF EXEMPLARY EMBODIMENTS

Figure 1:
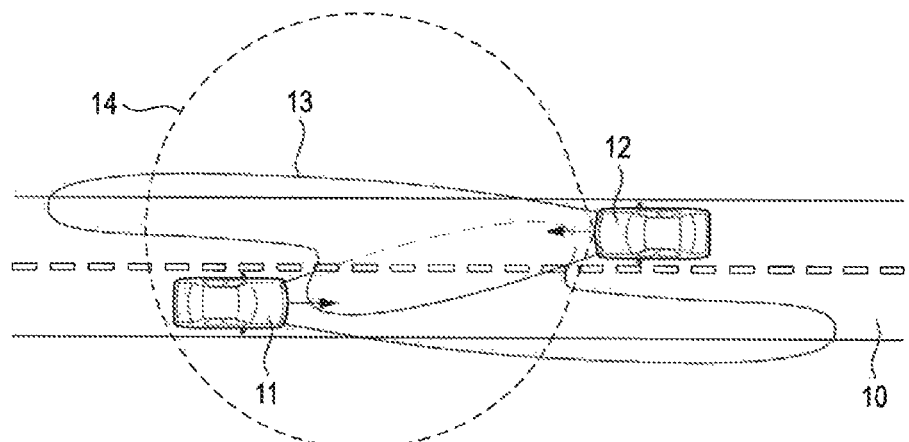
FIG. 1 shows an exemplary scenario with infrared radiation that is incident from the front.
Figure 2:
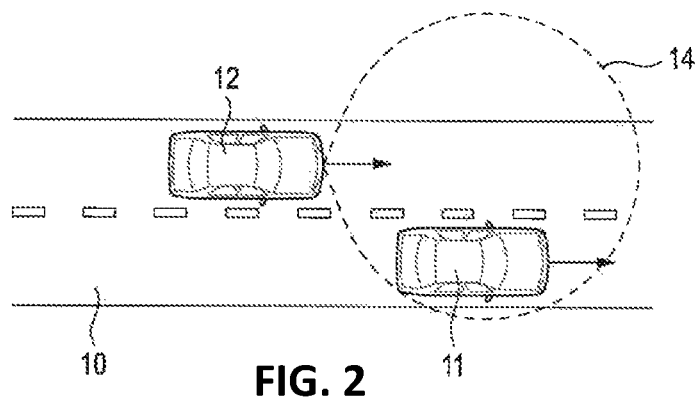
FIG. 2 shows an exemplary scenario with infrared radiation that is incident from obliquely behind.

FIG. 1 and FIG. 2 show advantageous application scenarios for a spectacle lens according to the disclosure.

In the scenario shown in FIG. 1, a first vehicle 11 and a second vehicle 12 travel in opposite directions along a road with respectively one lane in each direction. The oncoming vehicle 12 has a headlamp, the dipped beam cone 13 of which is deformed in such a way that blinding of the driver of the vehicle 11 is largely avoided. Moreover, the vehicle 12 comprises a night vision assistant, the infrared headlamp of which has a significantly wider IR illumination region 14, said night vision assistant consequently being able to facilitate improved night vision for the driver of the vehicle 12. To this end, an image of the IR illumination region 14 that was recorded by an infrared camera can be reproduced on a screen in the vehicle 12.

However, the driver of the vehicle 11 is here exposed to the infrared radiation coming from the front. Particularly at night, when the pupils are wide open, radiation emanating from the oncoming motor vehicles with night vision technology may consequently impinge directly on the retina. Putting the eyes at risk within the scope of these environmental conditions cannot be precluded.

Figure 4A:
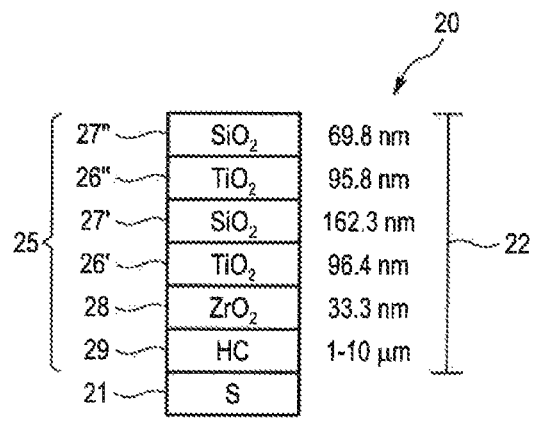
FIG. 4A shows a schematic view of an exemplary embodiment of a spectacle lens.
Figure 4B:
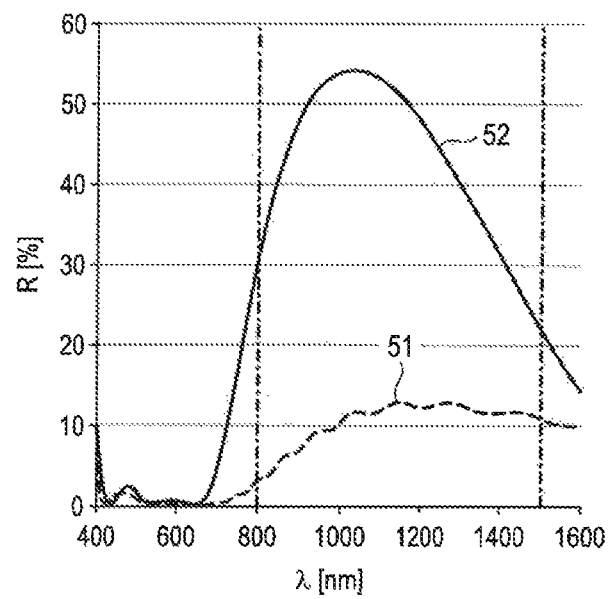
FIG. 4B shows a reflection curve of the spectacle lens from FIG. 4A.

By way of example, a coating with an at least partial mirroring or reflective effect in the infrared range (IR range) can be used as protection against such infrared radiation coming from the front. A schematic view of an exemplary embodiment of a spectacle lens 20 with a mirroring effect in the IR range is shown in FIG. 4A. FIG. 4B shows the corresponding reflection curve 52.

In a second application scenario, a first vehicle 11 and a second vehicle 12 travel in the same direction in the parallel lanes of a multi-lane road 10. In this case, the driver of the vehicle 11 is exposed to the infrared radiation 14, coming obliquely from behind, of the vehicle 12. If the vehicles 11 and 12 travel with a slight offset from one another at approximately the same speed, the driver of the vehicle 11 may also be exposed to infrared radiation coming obliquely from behind over a relatively long period of time. By contrast, the exposure in respect of radiation coming from the front—depending on the traffic—may be restricted to short time intervals. Since infrared radiation precisely does not lie in the visible range, no protective reflex such as, e.g., a reduction in the pupils or a lid-closing reflex is caused as a result thereof.

Figure 3:
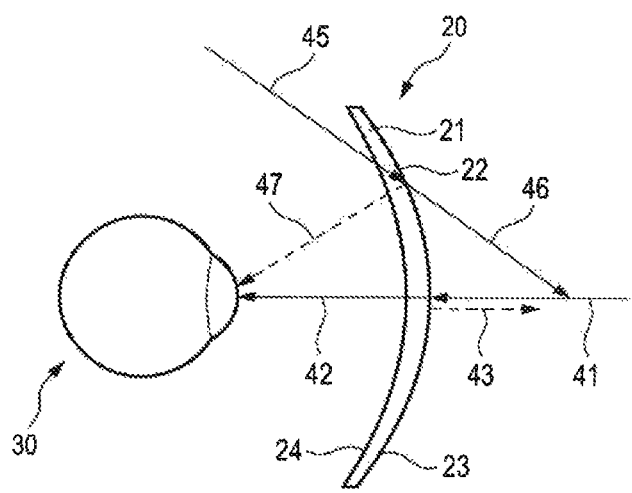
FIG. 3 shows an exemplary embodiment of a spectacle lens.

FIG. 3 shows a spectacle lens 20 with a lens substrate 21 and with a coating 22 applied onto the lens substrate 21. The coating 22 may have a plurality of layers of material with high, low and, optionally, mid refractive indices. The coating 22 has a first reflectivity of at least 20% for near infrared light at a first wavelength $\lambda_{NIR}$, which is incident on the coating 22 at an angle of incidence of 0°. For near infrared light at the first wavelength $\lambda_{NIR}$, which impinges on the coating 22 at an angle of incidence of 35°, the coating 22 has a second reflectivity which is reduced by at least 10% in relation to the first reflectivity. The coating 22 may be arranged on a front surface 23 and/or on a back surface 24 of the lens substrate 21 or of the spectacle lens 20. In the present exemplary embodiment, the coating 22 is arranged on the front surface 23.

In the scenario shown in FIG. 1 and FIG. 3, the incident light impinges on the front surface 23 at an angle of incidence of 0° (±15°) in respect of the perpendicular of the spectacle lens 20. The light that is incident at an angle of incidence of 0° is denoted by reference sign 41. A first portion 42 of the incident radiation 41 passes through the spectacle lens 20 with the coating 22. A second portion 43 of the incident radiation 41 is reflected at the coating 22 of the spectacle lens 20.

By the proposed coating 22 having a first reflectivity of at least 20% for near infrared light at the first wavelength $\lambda_{NIR}$, which impinges on the coating at an angle of incidence of 0°, and consequently providing an at least partly mirroring effect, a smaller portion of the infrared light that is incident from the front reaches the eye, and so a protective effect is provided in the infrared range. As described above, the exposure in respect of radiation coming from the front—depending on the traffic—may be restricted to short time intervals, and so a reflectivity of ≥20% can already develop a protective effect.

FIG. 3 further shows infrared radiation 45 that is incident obliquely from behind, said infrared radiation impinging on the back surface 24 or the front surface 23 of the spectacle lens 20 obliquely from behind, for example at an angle of incidence of 35°. A first portion 46 of the radiation 45 that is incident obliquely from behind passes through the spectacle lens 20 with the coating 22. A second portion 47 of the radiation 45 that is incident obliquely from behind is reflected at the coating 22 of the spectacle lens 20.

The infrared filter or mirror mentioned in the document US 2015/0146161 A1 would offer an effective protective effect in the case where only radiation 41 that enters from the front at an angle of incidence of 0° is present. Accordingly, the antireflection layer known from document US 2015/0241602 would offer effective protection in the infrared range for the case of radiation 45 that is only incident from obliquely behind since the radiation would almost entirely pass through the spectacle lens.

A combination of the teachings of these documents however does not offer the desired effect because if the antireflective effect known from U.S. Pat. No. 9,291,746 B2 were provided on the back surface 24 and if the IR mirroring known from US 2015/0146161 A1 were provided on the front surface 23, then radiation 45 that is incident obliquely from behind would pass through the back surface 24 unhindered, but would be reflected at the front surface 23 with the infrared mirror and would penetrate into the eye 30 of the user. This is problematic, particularly for the application case shown in FIG. 2, when the two vehicles drive at approximately the same speed next to one another with a slight offset in relation to one another over a relatively long period of time because a radiation exposure can occur here over a relatively long period of time.

Usually, the coating of a spectacle lens has a multiplicity of alternating layers with a low refractive index and a high refractive index following one another, the layers having precisely predetermined thicknesses. Such a broadband antireflective effect is advantageous, particularly in the case of spectacle lenses with a high refractive index, in order to reduce bothersome reflections and, moreover, facilitate a very good transmission. Usually, provision is made here for a plurality of layers with a high refractive index, the layers causing the desired antireflective effect together with the layers with a low refractive index. Here, the overall thickness of the layers with a high refractive index is, e.g., approximately 20 nm to 500 nm, particularly between 100 nm and 400 nm, more particularly between 150 nm and 300 nm. Typically, this consequently provides a spectacle lens with good antireflection properties in the visible range, the spectacle lens, moreover, facilitating an improved protective function in the infrared spectral range.

FIG. 4A shows an exemplary embodiment of a spectacle lens 20 which has a mirroring effect in the infrared range. The spectacle lens 20 has a lens substrate 21 that is transparent in the visible spectral range and, for example, produced from a plastic. This lens substrate 21 is provided with a coating 22, wherein the coating 22 has a layer sequence 25 with a plurality of layers. Here, the coating 22 lies on the lens substrate 21.

FIG. 4B shows a reflection curve of the spectacle lens 20 depicted schematically in FIG. 4A. Specified along the horizontal axis is the wavelength λ in nm, whereas the vertical axis specifies the reflection coefficient R in percent.

The lower curve 51 shows the reflectivity as a function of the wavelength for a conventional antireflection coating. By contrast, the spectacle lens 20 shown in FIG. 4A has the reflection curve 52 with a significantly increased mirroring or reflecting effect in the near infrared wavelength range of R>40% in the range from 840 nm to 1300 nm and of R>20% in the range from 750 nm to 1500 nm. Further, the spectacle lens 20 shown in FIG. 4A in this case has an effective broadband antireflective effect in the visible wavelength range with a blue residual reflection.

Figure 5A:
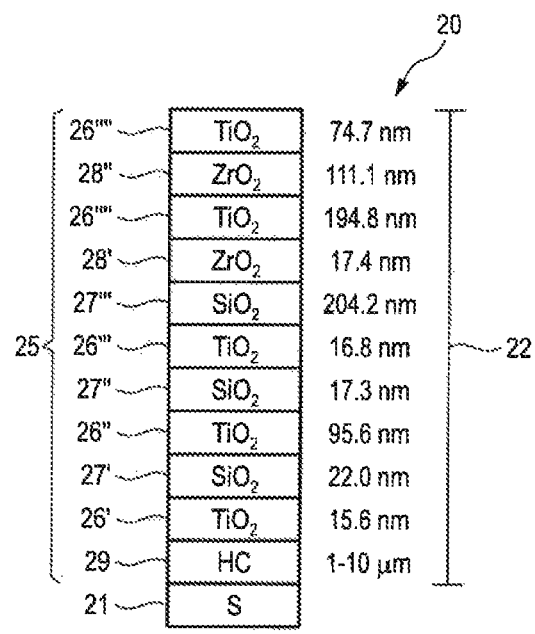
FIG. 5A shows a schematic view of a further exemplary embodiment of a spectacle lens.

FIG. 5A shows an exemplary embodiment of a spectacle lens 20. The spectacle lens 20 has a lens substrate 21 that is transparent in the visible spectral range and, for example, produced from a plastic. This lens substrate 21 is provided with a coating 22, wherein the coating 22 has a layer sequence 25 with a plurality of layers. Here, the coating 22 lies on the lens substrate 21. At an angle of incidence of 0°, the coating has a reflectivity of at least 20% at a wavelength $\lambda_{NIR}$ in the near infrared range and, at an angle of incidence of 35°, the coating has a reflectivity that is reduced by at least 10% in relation to the angle of incidence of 0° at the wavelength $\lambda_{NIR}$ in the near infrared range.

Moreover, the layer sequence 25 has a sequence of layers 26 with a high refractive index and layers 27 with a low refractive index. A layer 26 with a high refractive index may consist of a material with a high refractive index, the refractive index of which lies substantially above that of the substrate material 21. Titanium dioxide $TiO_2$ was used to this end in the present application example. The layers 27 with a low refractive index may consist of a material with a low refractive index, the refractive index of which may lie below that of the substrate material. Silicon dioxide $SiO_2$ was used to this end in the present application example. As a rule of thumb, the more layers there are, the more effective the antireflection coating or mirroring effect can be. However, the outlay and the complexity of the production process increase with the number of layers contained in the sequence.

Furthermore, the effect of the layer system can be provided with more flexibility by the addition of a third component with a mid refractive index, for example between that of the material 26 with a high refractive index and that of the material 27 with a low refractive index. In the present example, $ZrO_2$ can be provided to this end as a further layer 28. Moreover, a hard coat (HC) may be provided on the substrate material 21.

Within the coating 22, the hard coat layer 29 has the function that the hard coat layer 29 serves to compensate tension between the inorganic antireflective layers 26, 27, 28. The antireflective layers 26, 27, 28 usually have a relatively small coefficient of thermal expansion, while a high coefficient of thermal expansion is assigned to the lens substrate 21 that is produced from an organic plastic. Moreover, the side of the hard coat layer 29 distant from the lens substrate 21 may form a surface with good adhesive strength for the further coating layers 26, 27, 28.

In the exemplary embodiment shown in FIG. 5A, a hard coat layer 29 with a thickness from 1 to 10 µm, for example 3 µm, is initially provided on the lens substrate 21. First, a layer 26' made of titanium oxide with a thickness of 15.6 nm is arranged on the hard coat layer 29. On this, a layer 27' made of silicon oxide with a thickness of 22 nm is arranged in turn. Arranged on the latter is a second layer of titanium oxide with a thickness of 95.6 nm, with a second layer of silicon oxide with a thickness of 17.3 nm being arranged thereon in turn. Subsequently, on this, there is a third layer of titanium oxide with a thickness of 16.8 nm and a further layer of silicon oxide with a thickness of 204.2 nm. An advantage of this layer thickness is that an increased mechanical stability can once again be provided within the dielectric layer sequence 25. This is followed by a layer of zirconium oxide with a thickness of 17.4 nm, a further layer of titanium oxide with a thickness of 194.8 nm and a further layer of zirconium oxide with a thickness of 11.1 nm, as well as a terminating layer with a high refractive index made of titanium oxide with a thickness of 74.7 nm.

Figure 5B:
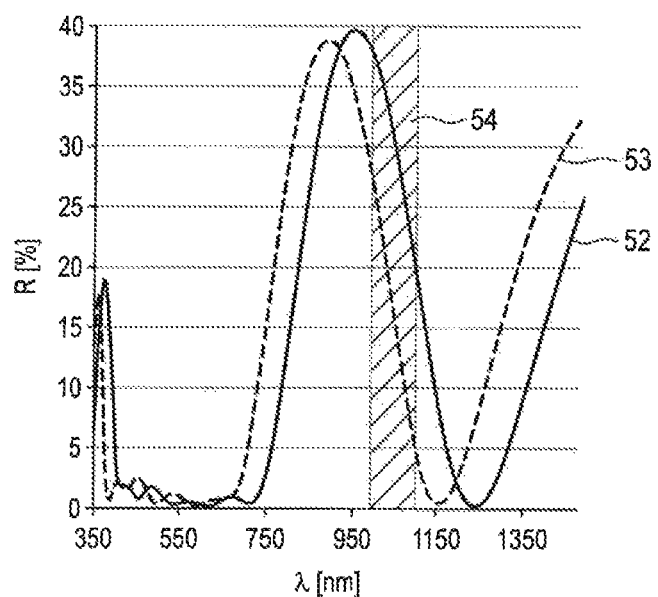
FIG. 5B shows a reflection curve of the spectacle lens from FIG. 5A.

FIG. 5B shows a first reflection curve 52 at an angle of incidence of 0° and a second reflection curve 53 at an angle of incidence of 35° for the spectacle lens 20 shown in FIG. 5A. Here, the spectacle lens 20 shown in FIG. 5A has an effective broadband antireflective effect in the visible wavelength range with a blue residual reflection, with the residual reflection in the blue range being optional. The coating further offers a significantly increased reflectivity or mirroring effect in the near infrared wavelength range of R>30% for 860 to 1050 nm.

Further, the coating offers a difference (large disparity) that is as large as possible between the reflection at 0° and 35° for the wavelength of 900 nm to 1200 nm, as is visible from the difference of the curves 52 and 53 in FIG. 5B. In a wavelength range 54, a reflectivity of at least 20% is provided at an angle of incidence of 0° and, additionally, the reflectivity at an angle of incidence of 35° lies at least 10% in absolute terms or at least 25 in relative terms below the reflectivity at an angle of incidence of 0°. Here, in the present example, the criterion of at least 20% reflectivity at an angle of incidence of 0° is decisive at the right limit of the range 54, whereas the minimum difference between the reflectivity at an angle of incidence of 0° and at an angle of incidence of 35° is crucial at the left edge of the range 54. In the present exemplary embodiment, the spectacle lens 20 with the coating 22 has a reflectivity that is reduced by at least 10% in relation to the angle of incidence of 0° over a wavelength range 54 which comprises a wavelength $\lambda_{NIR}$.

As a consequence, a sufficient protective effect is ensured in the range 54 in the case of radiation 41 that is incident from the front and, moreover, care is taken that the coating lets a sufficient portion of the radiation 45 that is incident obliquely from behind pass through the spectacle lens 20 and, as a consequence, reduces a back reflection into the eye.

Figure 6A:
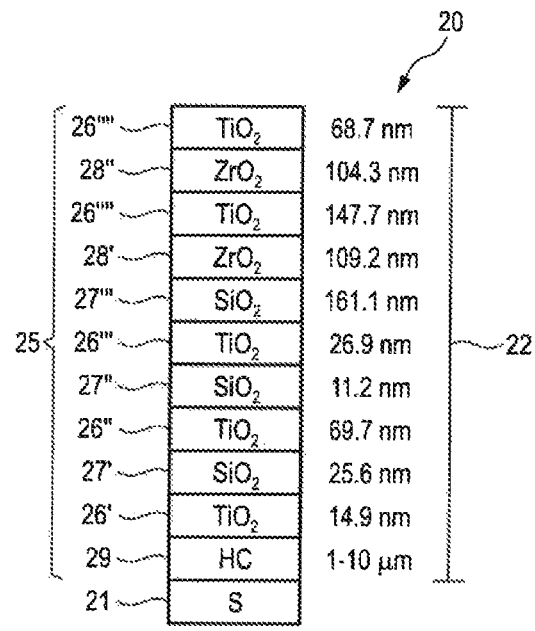
FIG. 6A shows a schematic view of a further exemplary embodiment of a spectacle lens.
Figure 6B:
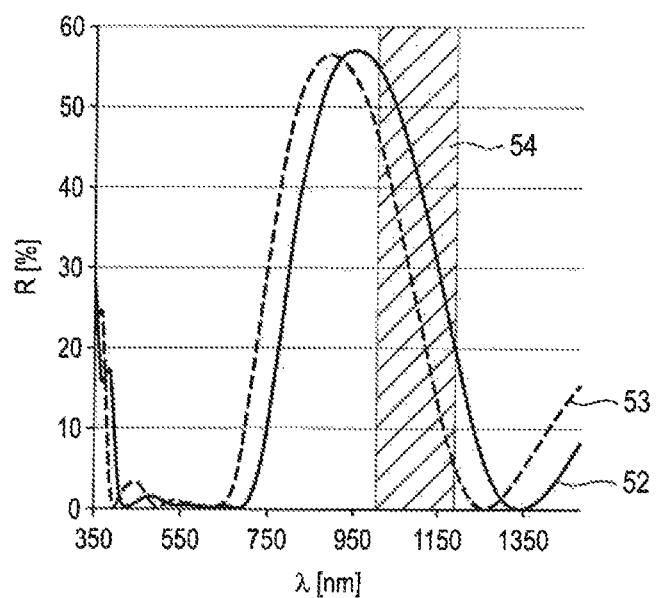
FIG. 6B shows a reflection curve of the spectacle lens from FIG. 6A.

In FIG. 6A and FIG. 6B, a further exemplary embodiment of a spectacle lens 20 is provided. The spectacle lens 20 proposed therein offers an effective broadband antireflective effect in the visible wavelength range with a blue residual reflection. Further, provision is made of a significantly increased reflectivity in the near infrared wavelength range of R>30% for 800 nm to 1150 nm. Moreover, a difference (large disparity) that is as large as possible between the reflectivity at 0° and at 35° is provided for the wavelength range from 1000 nm to 1300 nm. Once again, reflectivity of at least 20% is provided in a wavelength range 54. The spectacle lens 20 has a reflectivity that is reduced by at least 10% in relative terms or at least 20% in absolute terms in relation to the angle of incidence of 0° over a different wavelength range 54, which comprises a different wavelength $\lambda_{NIR}$.

The spectacle lens 20 shown in FIG. 6A and FIG. 6B also has a coating 22, the coating having the following layer sequence 25: a first layer of $TiO_2$ 26', followed by a first layer of $SiO_2$ 27', followed by a second layer of $TiO_2$ 26'', followed by a second layer of $SiO_2$ 27'', followed by a third layer of $TiO_2$ 26''', followed by a third layer of $SiO_2$ 267''', followed by a first layer of $ZrO_2$ 28', followed by a fourth layer of $TiO_2$ 26'''', followed by a second layer of $ZrO_2$ 28'', followed by a fifth layer of $TiO_2$ 26''. Here, a hard coat layer 29 may be provided between the lens substrate 21 and the first layer of $TiO_2$ 26'. The layer thicknesses are shown in FIG. 6A.

Figure 7A:
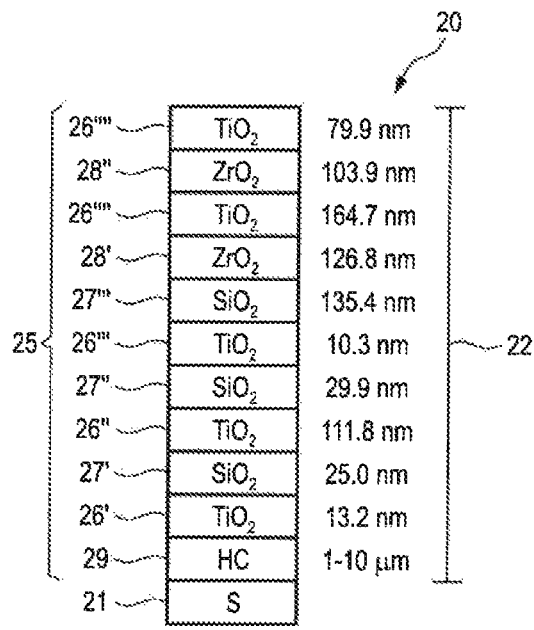
FIG. 7A shows a schematic view of a further exemplary embodiment of a spectacle lens.
Figure 7B:
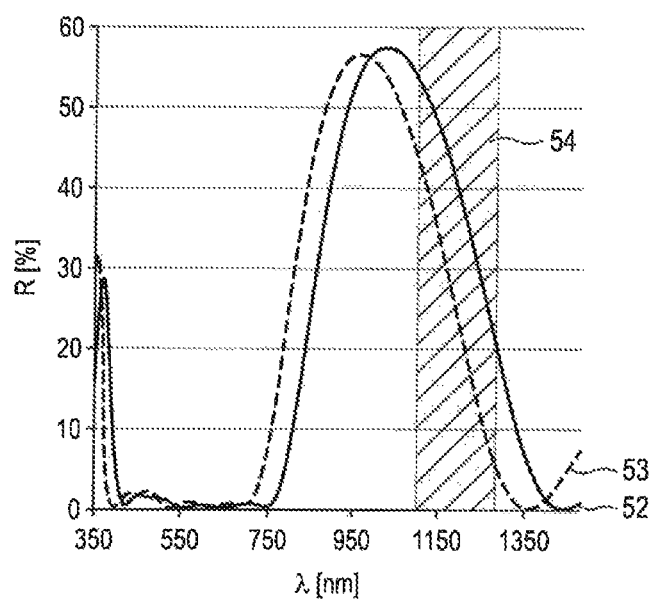
FIG. 7B shows a reflection curve of the spectacle lens from FIG. 7A.

FIG. 7A and FIG. 7B show a further exemplary embodiment of a spectacle lens 20 for a further wavelength range 54. The spectacle lens proposed therein offers an effective broadband antireflective effect in the visible wavelength range with a blue residual reflection. Further, provision is made of a significantly increased reflectivity in the near infrared wavelength range of R>30% for 850 nm to 1250 nm. Moreover, a difference (large disparity) that is as large as possible between the reflectivity at 0° and at 35° is provided for the wavelength range from 1100 nm to 1400 nm.

It is understood that the desired wavelength range and the desired reflecting effect at the wavelength $\lambda_{NIR}$ in the near infrared range at an angle of incidence of 0° and the desired reduction of the reflectivity at the wavelength $\lambda_{NIR}$ in the near infrared range at an angle of incidence of 35° in relation to the angle of incidence of 0° can be changed by modifying the layer thicknesses. Here, the required layer thicknesses and/or layer sequences of materials with different refractive indices can be ascertained by computer-implemented simulations. The smaller the range to be protected, the more effectively the difference can be maximized.

A layer structure can be designed as outlined below. Initially, a substrate material and potential layer materials can be selected. Typically, materials which are already used in other products or coatings are selected here. An advantage lies in efficient manufacturing. The refractive index $n(\lambda) = n_{real}(\lambda) + i \cdot k(\lambda)$ is provided for the substrate material and the layer materials as a function of the wavelength $\lambda$, over the wavelength range which is desired for the spectacle lens. By way of example, it is provided over a range from UV light via the visible range to the (near) infrared range, for example from 280 nm to 1500 nm. Here, $n_{real}(\lambda)$ is the real refractive index and $k(\lambda)$ is the extinction coefficient. Furthermore, one or more spectral requirements are provided as boundary conditions, for example (1) an effective antireflection effect in the visible range, for example a transmission in the wavelength range from 400 nm to 700 nm≥95%; (2) a reflectivity R≥20% (typically ≥30%, more typically ≥40%) for an angle of incidence of 0° angle at a wavelength $\lambda_{NIR}$ in the near infrared range, with particularity over a predetermined wavelength range; (3) a reflectivity of the wavelength $\lambda_{NIR}$ in the near infrared range that is reduced by at least 10% at an angle of incidence of 35° in relation to the angle of incidence of 0°; (4) optional further boundary conditions in the UV or short wavelength blue spectral range. On the basis thereof, the simulations can start with a layer structure that is as simple as possible, said layer structure possibly not yet satisfying the multifaceted requirements. Subsequently, further layers can be added iteratively to the layer structure and tests can be carried out to determine how far the spectral requirements are satisfied. Correspondence between the spectral requirements and the obtained simulation result can be achieved by adding one or more layers or by varying one or more layer thicknesses in the layer structure, for example by way of trial-and-error simulations. An exemplary procedure is described below with reference to FIG. 14. It is understood that the final layer structure should not be too complicated for stable production conditions. In the case of a number of possible solutions, the layer structure which can be manufactured best is typically selected.

Here, the wavelength range within the infrared spectrum, for which the eye should be in particular protected, can be set variably. This is particularly expedient if a wavelength range in which the eye reacts particularly sensitively to incident IR light is identified or if there is a certain application in which particularly large amounts of light of a specific wavelength or a specific wavelength range can be incident on the spectacle lens. By way of example, if the range between 900 nm and 1200 nm is considered to be particularly critical then the difference between the reflection at 0° and 35° (30°-45°) can be maximized precisely in this range by an appropriate adaptation of the layer design. In the exemplary embodiment according to FIGS. 5A and 5B, an average (relative) reduction of approximately 50% was achieved for this range for the oblique reflection in relation to the perpendicular reflection. In the exemplary embodiments according to FIGS. 6A and 6B and FIGS. 7A and 7B, the range to be optimized was displaced from 900 to 1200 nm (FIGS. 5A, 5B) to 1000 to 1300 nm (FIGS. 6A, 6B) and 1100 to 1400 nm (FIGS. 7A, 7B).

Figure 8A:
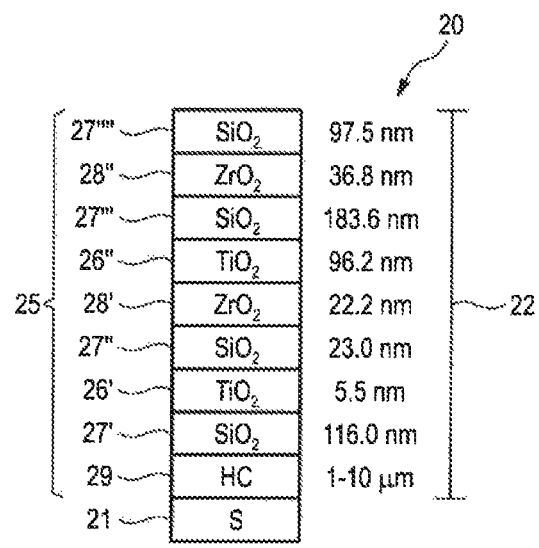
FIG. 8A shows a schematic view of a further exemplary embodiment of a spectacle lens.
Figure 8B:
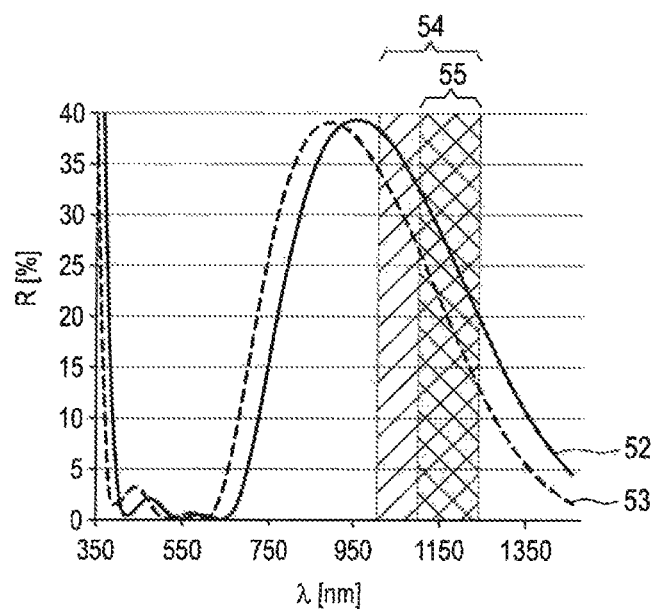
FIG. 8B shows a reflection curve of the spectacle lens from FIG. 8A.

FIG. 8A and FIG. 8B show a further exemplary embodiment of a spectacle lens 20 for a further wavelength range 54. The spectacle lens proposed therein offers an effective broadband antireflective effect in the visible wavelength range. Here, the coating 22 consists of 8 layers and an optional hard coat layer 29. This is advantageous in that the coating is more easily implementable in production than the exemplary embodiments shown above. Further, provision is made of a termination layer 27'''' with a low refractive index, SiO$_2$ in this case. This is advantageous in that an optional further layer adheres better, for example for better cleaning of the spectacle lens 20.

FIG. 8B shows a first reflection curve 52 at an angle of incidence of 0° and a second reflection curve 53 at an angle of incidence of 35° for the spectacle lens 20 shown in FIG. 8A. In the range 54 from 1000 nm to 1240 nm, the spectacle lens 20 has a reflectivity of at least 20% at an angle of incidence of 0° and the relative difference or reduction in the reflectivity at the angle of incidence of 35° in relation to the angle of incidence of 0° is at least 10%. In the portion 55 from 1100 nm to 1240 nm, the spectacle lens 20 has a reflectivity of at least 20% at an angle of incidence of 0° and the relative difference or reduction in the reflectivity at the angle of incidence of 35° in relation to the angle of incidence of 0° is at least 20%.

Figure 9A:
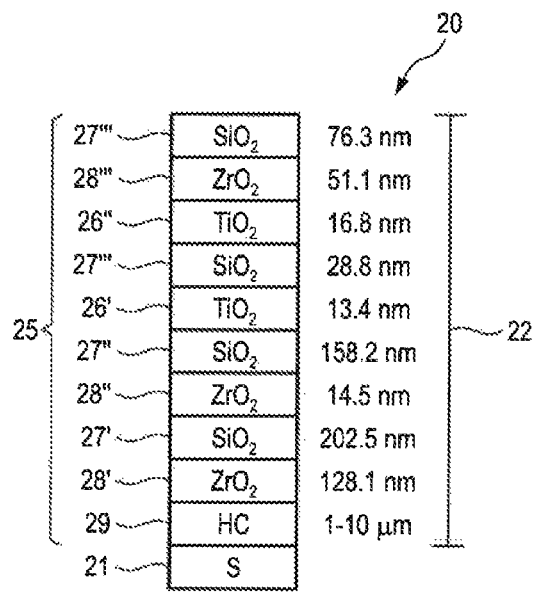
FIG. 9A shows a schematic view of a further exemplary embodiment of a spectacle lens.
Figure 9B:
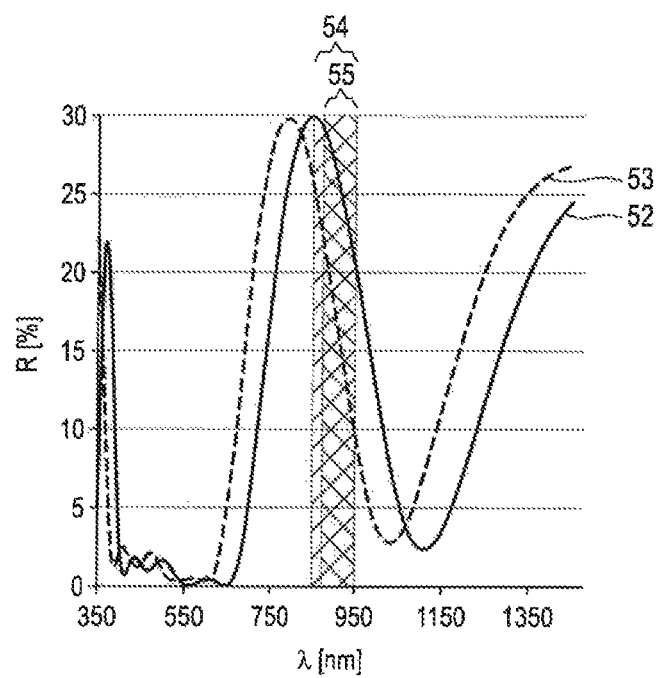
FIG. 9B shows a reflection curve of the spectacle lens from FIG. 9A.

FIG. 9A and FIG. 9B show a further exemplary embodiment of a spectacle lens 20 for a further wavelength range 54. Here, the coating 22 consists of 9 layers and an optional hard coat layer 29. Further, provision is made again of a termination layer 27'''' with a low refractive index, SiO$_2$ in this case.

FIG. 9B shows a first reflection curve 52 at an angle of incidence of 0° and a second reflection curve 53 at an angle of incidence of 35° for the spectacle lens 20 shown in FIG. 9A. In the range 54 from 840 nm to 950 nm, the spectacle lens 20 has a reflectivity of at least 20% at an angle of incidence of 0° and the relative difference or reduction in the reflectivity at the angle of incidence of 35° in relation to the angle of incidence of 0° is at least 10%. In the portion 55 from 870 nm to 950 nm, the relative difference or reduction in the reflectivity at the angle of incidence of 35° in relation to the angle of incidence of 0° is at least 20%.

The exemplary embodiments shown above illustrate that restricting one parameter, here the width of the wavelength range for which the conditions need to be satisfied, allows other parameters to be widened, in this case a relative reduction in the angle-dependent reflectivity by at least 20% instead of 10%.

With particularity, a spectacle lens according to the disclosure proposed here may further have additional coatings, optionally on the front surface 23 or back surface 24.

Figure 10:
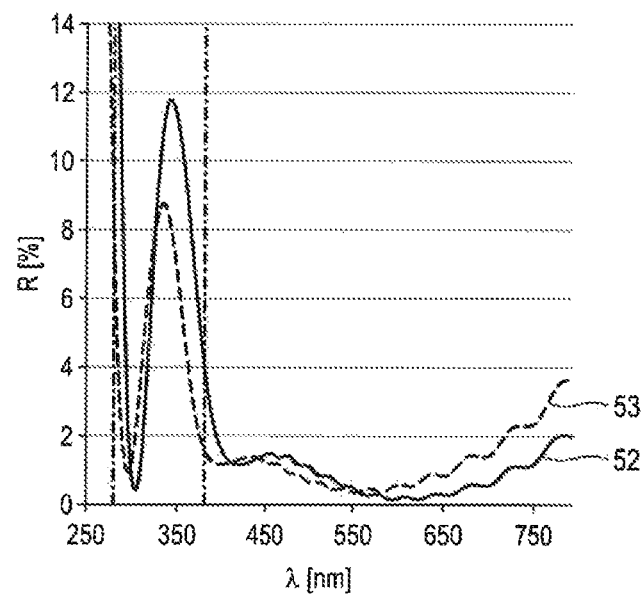
FIG. 10 shows a reflection curve of a spectacle lens with a reflection in the blue or UV ray range.

In this context, FIG. 10 shows a reflection curve of an advantageous antireflective effect which can preferably be provided on the back surface 24 in order to offer additional protection against high-energy or short-wavelength blue light. The coating shown in FIG. 10 also offers an effective broadband antireflective effect in the visible wavelength range with a blue residual reflection. The curve 52 shows the reflectivity at an angle of incidence of 0°, whereas the curve 53 specifies the reflectivity at an angle of incidence of 35°. The following table shows the layer structure of the coating according to FIG. 10.

TABLE 1

| Layer | Thickness (nm) |
|---|---|
| Lens substrate | |
| HC | 3000.0 |
| ZrO$_2$ | 18.7 |
| SiO$_2$ | 30.9 |
| ZrO$_2$ | 86.7 |

TABLE 1-continued

| Layer | Thickness (nm) |
|---|---|
| Lens substrate | |
| TiO$_2$ | 8.0 |
| ZrO$_2$ | 44.5 |
| ITO | 3.0 |
| SiO$_2$ | 85.7 |

Figure 11:
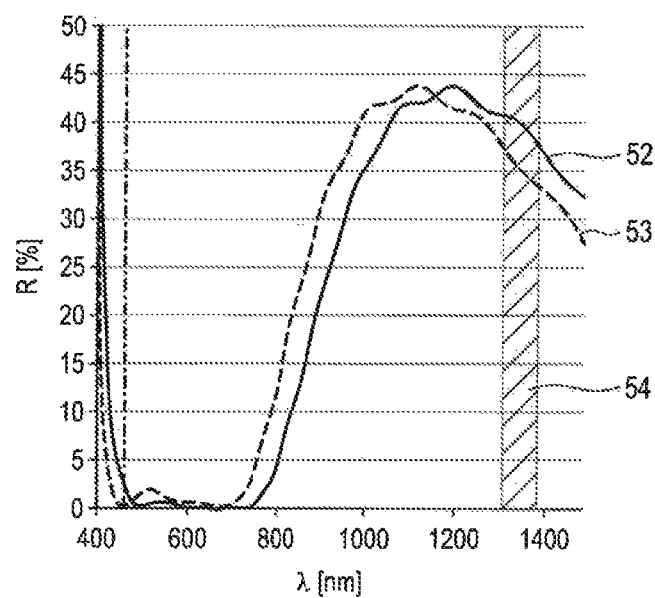
FIG. 11 shows a further exemplary embodiment of a reflection curve of a spectacle lens.

FIG. 11 shows a further advantageous reflection curve which offers an effective broadband antireflective effect in the visible wavelength range with a blue residual reflection and a significantly increased reflectivity in the near infrared wavelength range R>30% for 950 nm to 1500 nm. The mean reflectivity in the wavelength range from 400 nm to 460 nm is at least 14%. Such an at least partly mirroring effect can be expedient for, in particular, infrared radiation that is incident from the front, as shown in the exemplary scenario in FIG. 1.

The curve 52 shows the reflectivity at an angle of incidence of 0°, whereas the curve 53 specifies the reflectivity at an angle of incidence of 35°. At an angle of incidence of 0° and in a wavelength range 54, the coating has a reflectivity of at least 20% at a wavelength $\lambda_{NIR}$ in the near infrared range and, additionally, at an angle of incidence of 35°, the coating has a reflectivity that is reduced by at least 10% in relation to the angle of incidence of 0°. As an alternative to the exemplary embodiments specified above, the percentage reduction in the reflectivity may also emerge as a relative reduction of the reflectivity at the wavelength $\lambda_{NIR}$ at 0° and at 35°. By way of example, a reflectivity that is reduced by at least 10% at an angle of incidence of 35° in relation to the angle of incidence of 0° may, in relation to a reflectivity of 40% at an angle of incidence of 0°, correspond to a reflectivity of no more than 36% at an angle of incidence of 35°.

The following table shows the layer structure of the coating according to FIG. 11.

TABLE 2

| Layer | Thickness (nm) |
|---|---|
| Lens substrate | |
| HC | 3000.0 |
| ZrO$_2$ | 110.5 |
| TiO$_2$ | 10.4 |
| ZrO$_2$ | 8.0 |
| TiO$_2$ | 5.2 |
| SiO$_2$ | 197.5 |
| ITO | 3.0 |
| TiO$_2$ | 110.5 |
| SiO$_2$ | 84.6 |

Figure 12:
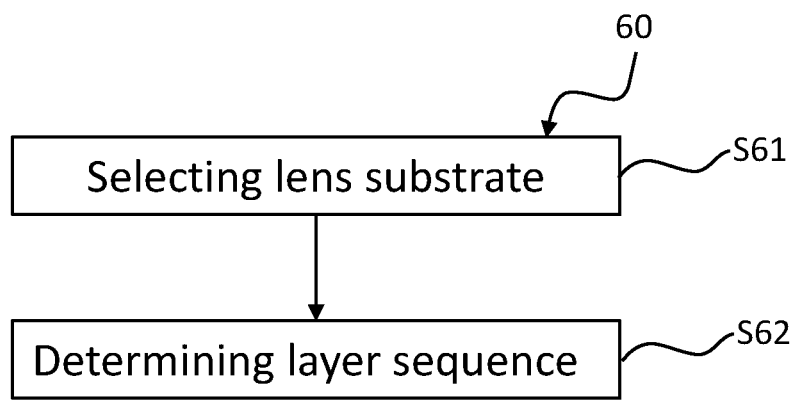
FIG. 12 shows a flowchart of a method for designing a spectacle lens.

FIG. 12 shows a flowchart of a method 60, in particular a computer-implemented or experimental method, for designing a spectacle lens 20. The spectacle lens 20 comprises a lens substrate 21 and a coating 22, applied onto the lens substrate, with a layer sequence 25 that forms the coating 22.

In the present exemplary embodiment, a lens substrate 21 is selected in a first step S61. The lens substrate may provide a desired dioptric and/or prismatic optical power.

A layer sequence 25 is determined in a second step S62, wherein the layer sequence 25 is determined with the stipulation that the coating 22 has a first reflectivity of at least 20% for near infrared light at a first wavelength $\lambda_{NIR}$, which impinges on the coating 22 at an angle of incidence of 0°, and a second reflectivity for near infrared light at the first wavelength $\lambda_{NIR}$, which impinges on the coating 22 at an angle of incidence of 35°, the second reflectivity being reduced by at least 10% in relation to the first reflectivity. Exemplary layer sequences 25 are described above.

Figure 13:
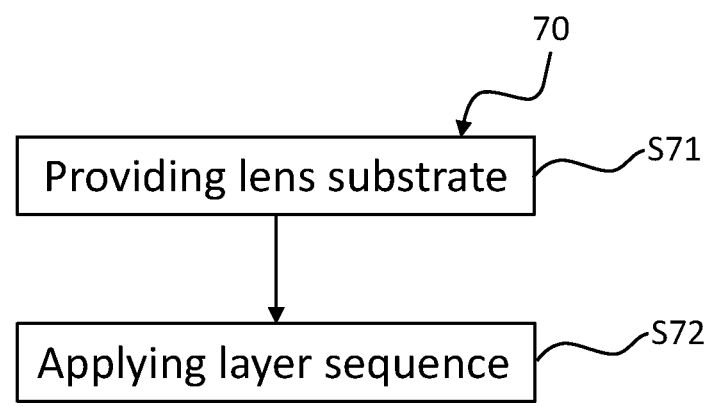
FIG. 13 shows a flowchart of a method for producing a spectacle lens.

FIG. 13 shows a flowchart of a method 70 for producing a spectacle lens 20. The spectacle lens 20 comprises a lens substrate 21 and a coating 22, applied onto the lens substrate, with a layer sequence 25 that forms the coating 22.

A lens substrate 21 is provided in a first step S71. The lens substrate may provide a desired dioptric and/or prismatic optical power.

The layer sequence 25 is applied in a second step S72, wherein the layer sequence 25 is applied with the stipulation that the coating 22 has a first reflectivity of at least 20% for near infrared light at a first wavelength $\lambda_{NIR}$, which impinges on the coating 22 at an angle of incidence of 0°, and a second reflectivity for near infrared light at the first wavelength $\lambda_{NIR}$, which impinges on the coating 22 at an angle of incidence of 35°, the second reflectivity being reduced by at least 10% in relation to the first reflectivity. Exemplary layer sequences 25 are described above. The individual layers of the layer sequence 25 are applied in successive partial steps. Exemplary layer sequences 25 are disclosed in the aforementioned exemplary embodiments which satisfy the stipulation. Alternative layer sequences can be obtained, in particular, according to the aforementioned computer-implemented or experimental method for designing a spectacle lens 20 and can be applied accordingly onto the lens substrate 21.

Figure 14:
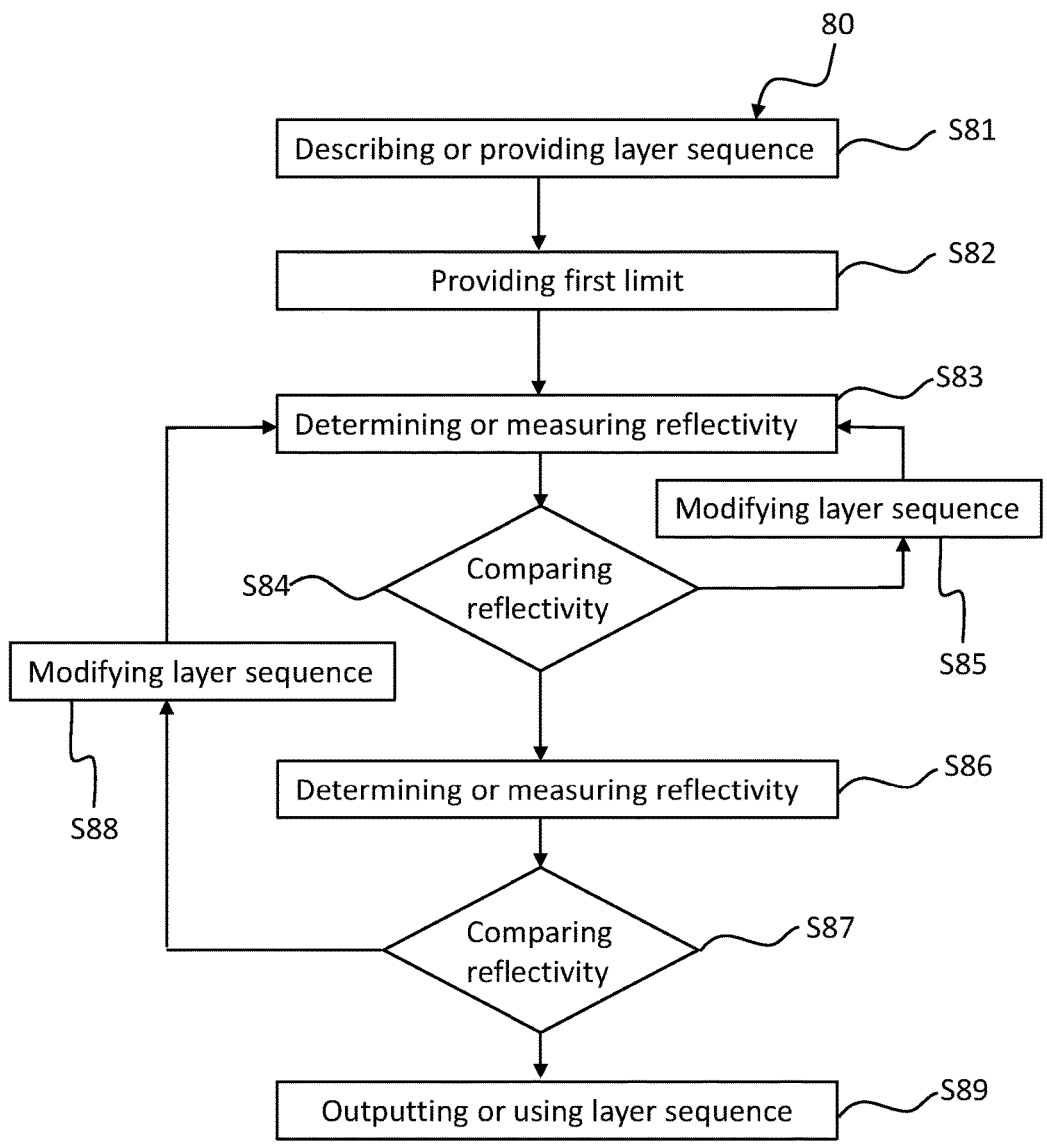
FIG. 14 shows a flowchart of method steps for determining a layer sequence.

FIG. 14 shows an exemplary flowchart 80 of method steps for determining a layer sequence 25, as may be used in an exemplary manner in a method 60, in particular computer-implemented or experimental method, for designing a spectacle lens 20, as shown in FIG. 12. In order to avoid repetition, the method steps of an exemplary computer-implemented method and an exemplary experimental method are both explained together on the basis of the flowchart 80 in FIG. 14.

In a first step S81, parameters describing a first layer sequence 25 of a coating 22 are provided (computer-implemented method) or a first layer sequence 25 of a coating 22 is provided (experimental method).

In a second step S82, a first limit that represents the first reflectivity, for example of at least 20%, is provided.

In a third step S83, the reflectivity of the coating 22 is determined (computer-implemented method) or measured (experimental method) for near infrared light at the first wavelength $\lambda_{NIR}$, which impinges on the coating 22 at the angle of incidence of 0°.

In a fourth step S84, the reflectivity that was determined or measured in step S83 is compared to the first limit.

Should the comparison in step S84 yield that the reflectivity determined in step S83 does not exceed the first limit, the parameters describing the first layer sequence 25 are modified (computer-implemented method) or the layer sequence 25 is modified (experimental method) in step S85. Subsequently, steps S83 and S84 are carried out again. Consequently, this is an iterative procedure for determining a coating 22 with a layer sequence 25 that has the desired reflectivity.

Should the comparison in step S84 yield that the reflectivity determined in step S83 exceeds the first limit, the reflectivity of the coating 22 for near infrared light at the first wavelength $\lambda_{NIR}$, which impinges on the coating 22 at the angle of incidence of 35°, is determined (computer-implemented method) or measured (experimental method) in step S86.

In the subsequent step S87, the reflectivity determined in step S86 is compared to the reflectivity determined in step S83 (computer-implemented method) or the reflectivity measured in step S86 is compared to the reflectivity measured in step S83 (experimental method).

Should the comparison in step S87 yield that the reflectivity determined or measured in step S86 does not drop below the reflectivity determined or measured in step S83 by more than 10%, the parameters describing the first layer sequence 25 are modified (computer-implemented method) or the layer sequence 25 is modified (experimental method) in step S88.

Should the comparison in step S87 yield that the reflectivity determined or measured in step S86 drops below the reflectivity determined or measured in step S83 by more than 10%, the parameters describing the first layer sequence are output as parameters describing the layer sequence 25 of the coating 22 (computer-implemented method) or the layer sequence 25 is used as the layer sequence 25 of the coating 22 to be determined in step S89.

Figure 15:
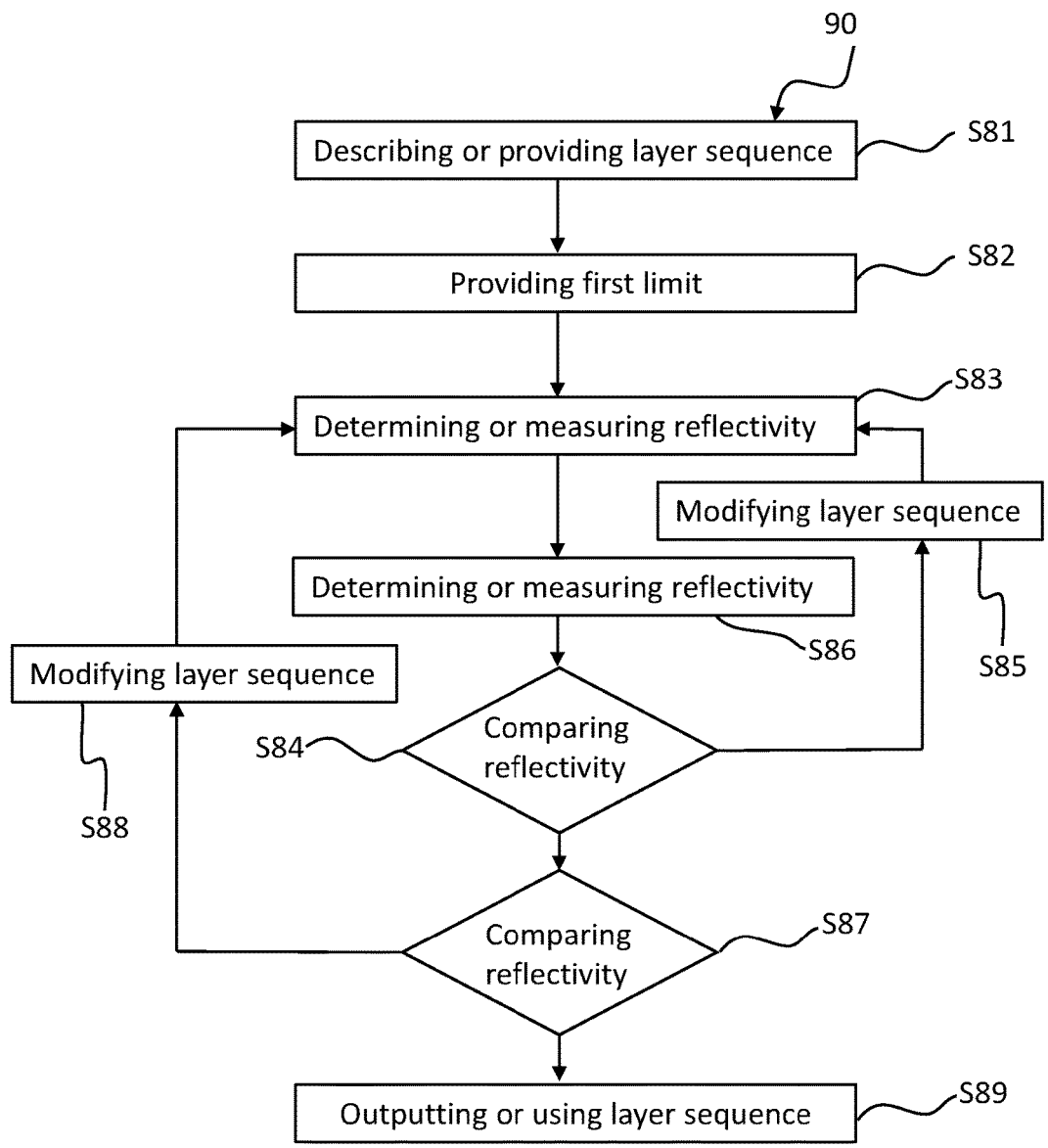
FIG. 15 shows a flowchart of a further exemplary embodiment of method steps for determining a layer sequence.

FIG. 15 shows a development of the exemplary flowchart 80 of method steps for determining a layer sequence 25 from FIG. 14. Method steps may also be carried out in a different sequence and/or in parallel, provided that these do not depend on one another. In the flowchart shown in FIG. 15, determining or measuring the reflectivity of the coating 22 for near infrared light at the first wavelength $\lambda_{NIR}$, which impinges on the coating 22 at the angle of incidence of 35°, according to step S86 is now carried out prior to the comparison according to step S84. In particular, steps S83 and S86 can also be carried out in parallel.

In conclusion, an improved protective effect for the eyes in the infrared spectral range, in particular, can be achieved using the solution proposed herein.

The foregoing description of the exemplary embodiments of the disclosure illustrates and describes the present disclosure. Additionally, the disclosure shows and describes only the exemplary embodiments, but, as mentioned above, it is to be understood that the disclosure is capable of being used in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents, and patent applications cited in this specification are herein incorporated by reference, and for any and all purposes, as if each individual publication, patent, or patent application were specifically and individually indicated to be incorporated by reference. In the case of inconsistencies, the present disclosure will prevail.

What is claimed is:

1. A spectacle lens comprising:
   a lens substrate, and
   a coating that is applied onto the lens substrate,
   wherein the coating has a first reflectivity of at least 20% for near infrared light at a first wavelength $\lambda_{NIR}$, which impinges on the coating at an angle of incidence of 0°, and
   wherein the coating has a second reflectivity for near infrared light at the first wavelength $\lambda_{NIR}$, which impinges on the coating at an angle of incidence of 35°, the second reflectivity being reduced by at least 10% in relation to the first reflectivity.

2. The spectacle lens according to claim 1, wherein the spectacle lens has a mean transmission of at least 95% in a visible wavelength range of 400 nm to 700 nm for an angle of incidence of 0°.

3. The spectacle lens according to claim 2, wherein the mean transmission is at least 98%.

4. The spectacle lens according to claim 1, wherein the wavelength $\lambda_{NIR}$ in the near infrared range lies in a wavelength range selected from the group consisting of wavelength ranges of from 780 nm to 1500 nm, of from 800 nm to 1200 nm, and of from 850 nm to 1100 nm.

5. The spectacle lens according to claim 1, wherein the coating has a reflectivity that is reduced by at least 10% in relation to the angle of incidence of 0° over a wavelength range which includes the first wavelength $\lambda_{NIR}$ in the near infrared range.

6. The spectacle lens according to claim 1, wherein, at an angle of incidence of 0°, the coating has a reflectivity selected from the group consisting of at least 25%, at least 30%, at least 40%, and at least 50%, at the first wavelength $\lambda_{NIR}$ in the near infrared range.

7. The spectacle lens according to claim 1, wherein, at an angle of incidence of 35°, the coating has a reflectivity that is reduced by at least an amount selected from the group consisting of 15%, 20%, 25%, and 30% in relation to the angle of incidence of 0° at the first wavelength $\lambda_{NIR}$ in the near infrared range.

8. The spectacle lens according to claim 1, wherein, over an angle of incidence range of 30° to 45°, the coating has a reflectivity that is reduced by at least 10% in relation to the angle of incidence of 0° at the first wavelength $\lambda_{NIR}$ in the near infrared range.

9. The spectacle lens according to claim 1, wherein the lens substrate has a front surface and a back surface, and the coating is applied onto the front surface of the lens substrate.

10. The spectacle lens according to claim 9, wherein the lens substrate further comprises an infrared (IR) absorber.

11. The spectacle lens according to claim 9, wherein the coating is also applied onto the back surface of the lens substrate.

12. The spectacle lens according to claim 1, wherein the lens substrate has a front surface and a back surface; and
wherein the back surface has an antireflection coating for at least one range selected from the group consisting of visible light, IR light, and ultraviolet (UV) light; or
wherein the front surface has a reflecting coating for at least one range from the group consisting of UV light and short-wavelength blue light; or
wherein the back surface has the antireflection coating for at least one range selected from the group consisting of visible light, IR light, and UV light and the front surface has the reflecting coating for at least one range selected from the group consisting of UV light and short-wavelength blue light.

13. A computer-implemented or experimental method for designing a spectacle lens including a lens substrate and coating that is applied onto the lens substrate, wherein the coating is formed with a layer sequence, the method comprising the step of:
determining a layer sequence, wherein the layer sequence is determined with the stipulation that the coating has a first reflectivity of at least 20% for near infrared light at a first wavelength $\lambda_{NIR}$, which impinges on the coating at an angle of incidence of 0°, and a second reflectivity for near infrared light at the first wavelength $\lambda_{NIR}$, which impinges on the coating at an angle of incidence of 35°, the second reflectivity being reduced by at least 10% in relation to the first reflectivity.

14. The computer-implemented method for designing a spectacle lens according to claim 13, wherein determining the layer sequence comprises the steps of:
a) providing parameters that describe a first layer sequence of a coating;
b) providing a first limit of at least 20% that represents the first reflectivity;
c) determining the reflectivity of the coating for near infrared light at the first wavelength $\lambda_{NIR}$, which is incident on the coating at the angle of incidence of 0°;
d) comparing the reflectivity determined in step c) with the first limit;
e1) should the comparison carried out in step d) determine that the first limit was not exceeded by the reflectivity determined in step c):
f1) modifying the parameters that describe the first layer sequence, and
g1) carrying out steps c) to d);
e2) should the comparison carried out in step d) determine that the first limit was exceeded:
f2) determining the reflectivity of the coating for near infrared light at the first wavelength $\lambda_{NIR}$, which is incident on the coating at the angle of incidence of 35°,
g2) comparing the reflectivity determined in step f2) with the reflectivity determined in step c);
h2.1) should the comparison carried out in step g2) determine that the reflectivity determined in step f2) does not drop below the reflectivity determined in step c) by more than 10%:
i2.1) modifying the parameters that describe the first layer sequence, and
j2.1) carrying out steps c) to d);
h2.2) should the comparison carried out in step g2) determine that the reflectivity determined in step f2) drops below the reflectivity determined in step c) by more than 10%:
k2.2) outputting the parameters describing the first layer sequence as the parameters describing the layer sequence of the coating.

15. The experimental method for designing a spectacle lens according to claim 13, wherein determining the layer sequence comprises the steps of:
a) providing a first layer sequence of a coating;
b) providing a first limit of at least 20% that represents the first reflectivity;
c) measuring the reflectivity of the coating for near infrared light at the first wavelength $\lambda_{NIR}$, which is incident on the coating at the angle of incidence of 0°;
d) comparing the reflectivity measured in step c) with the first limit;
e1) should the comparison carried out in step d) determine that the first limit was not exceeded by the reflectivity determined in step c):
f1) modifying the first layer sequence, and
g1) carrying out steps c) to d);
e2) should the comparison carried out in step d) determine that the first limit was exceeded:
f2) measuring the reflectivity of the coating for near infrared light at the first wavelength $\lambda_{NIR}$, which is incident on the coating at the angle of incidence of 35°;
g2) comparing the reflectivity measured in step f2) with the reflectivity measured in step c);

h2.1) should the comparison carried out in step g2) determine that the reflectivity measured in step f2) does not drop below the reflectivity measured in step c) by more than 10%:
  i2.1) modifying the first layer sequence, and
  j2.1) carrying out steps c) to d);
h2.2) should the comparison carried out in step g2) determine that the reflectivity measured in step f2) drops below the reflectivity measured in step c) by more than 10%:
  k2.2) applying the first layer sequence as the layer sequence for the coating.

16. The computer-implemented method for designing a spectacle lens according to claim 13, wherein determining the layer sequence comprises the steps of:
a) providing parameters that describe a first layer sequence of a coating;
b) providing a first limit of at least 20% that represents the first reflectivity;
c) determining the reflectivity of the coating for near infrared light at the first wavelength $\lambda_{NIR}$, which is incident on the coating at the angle of incidence of 0°;
d) determining the reflectivity of the coating for near infrared light at the first wavelength $\lambda_{NIR}$, which is incident on the coating at the angle of incidence of 35°;
e) comparing the reflectivity determined in step c) with the first limit;
f1) should the comparison carried out in step e) determine that the first limit was not exceeded by the reflectivity determined in step c):
  g1) modifying the parameters that describe the first layer sequence, and
  h1) carrying out steps c) to e);
f2) should the comparison carried out in step e) determine that the first limit was exceeded:
  g2) comparing the reflectivity determined in step d) with the reflectivity determined in step c);
  h2.1) should the comparison carried out in step g2) determine that the reflectivity determined in step d) does not drop below the reflectivity determined in step c) by more than 10%:
    i2.1) modifying the parameters that describe the first layer sequence, and
    j2.1) carrying out steps c) to e);
  h2.2) should the comparison carried out in step g2) determine that the reflectivity determined in step d) drops below the reflectivity determined in step c) by more than 10%:
    k2.2) outputting the parameters describing the first layer sequence as the parameters describing the layer sequence of the coating.

17. A method for producing a spectacle lens including a lens substrate and a coating that is applied onto the lens substrate, wherein the coating is formed with a layer sequence, wherein the method comprises the steps of:
providing a lens substrate, and
applying the layer sequence onto the lens substrate,
wherein the layer sequence is applied with the stipulation that the coating has a first reflectivity of at least 20% for near infrared light at a first wavelength $\lambda_{NIR}$, which impinges on the coating at an angle of incidence of 0°, and a second reflectivity for near infrared light at the first wavelength $\lambda_{NIR}$, which impinges on the coating at an angle of incidence of 35°, the second reflectivity being reduced by at least 10% in relation to the first reflectivity.

* * * * *